(12) United States Patent
Hamamoto et al.

(10) Patent No.: US 6,333,827 B1
(45) Date of Patent: Dec. 25, 2001

(54) MAGNETIC SIGNAL REPRODUCING DEVICE, MAGNETIC SIGNAL REPRODUCING METHOD AND MAGNETIC RECORDING MEDIUM FOR HIGH DENSITY REPRODUCTION

(75) Inventors: Masaki Hamamoto, Tenri; Kunio Kojima, Nabari; Hiroyuki Katayama, Nara; Shinzo Sawamura, Nishinomiya; Junichi Sato, Nara, all of (JP)

(73) Assignee: Sharp Kabushiki Kaisha, Osaka (JP)

(*) Notice: Subject to any disclaimer, the term of this patent is extended or adjusted under 35 U.S.C. 154(b) by 0 days.

(21) Appl. No.: 09/596,572

(22) Filed: Jun. 16, 2000

(30) Foreign Application Priority Data

Jun. 16, 1999 (JP) .................................................. 11-169337

(51) Int. Cl.⁷ ...................................................... G11B 5/02
(52) U.S. Cl. ................................ 360/59; 369/13; 369/116
(58) Field of Search ................................ 360/59; 369/13, 369/116

(56) References Cited

U.S. PATENT DOCUMENTS 5,357,494 * 10/1994 Aratani ................................ 369/13
5,726,954 * 3/1998 Matsumoto et al. .................. 369/13
6,041,024 * 3/2000 Ishii ..................................... 369/13

FOREIGN PATENT DOCUMENTS

B2617025 3/1997 (JP) .

* cited by examiner

*Primary Examiner*—Regina Y. Neal

(57) ABSTRACT

The present invention is a magnetic signal reproducing device for reproducing information from a magnetic recording medium in which a polarity of magnetization is inverted at a first temperature during temperature change. The device includes local temperature raising device for locally raising the temperature of the magnetic recording medium, and reproducing device for magnetically detecting information recorded on the magnetic recording medium. In the device, during a reproducing operation, the local temperature raising device forms an area having a lower temperature than the first temperature and an area having a higher temperature than the first temperature within an area in the magnetic recording medium, thereby reducing contribution to reproduced signal from magnetization of an area other than a reproduction target area.

15 Claims, 22 Drawing Sheets

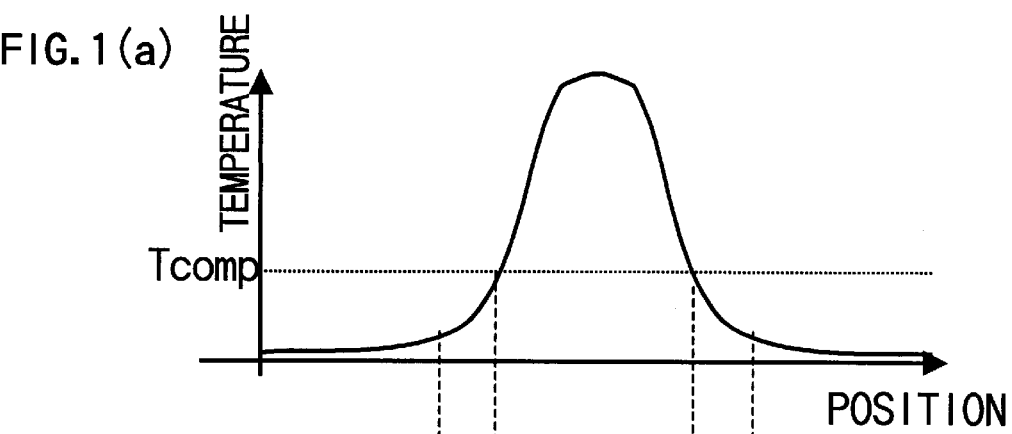
FIG. 1(a)
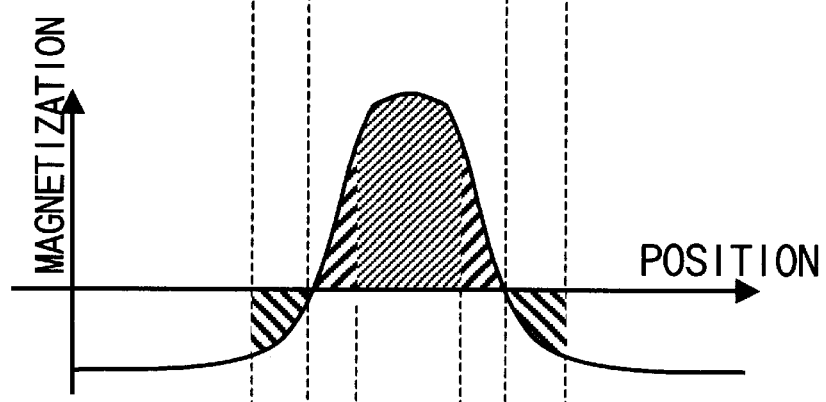
FIG. 1(b)
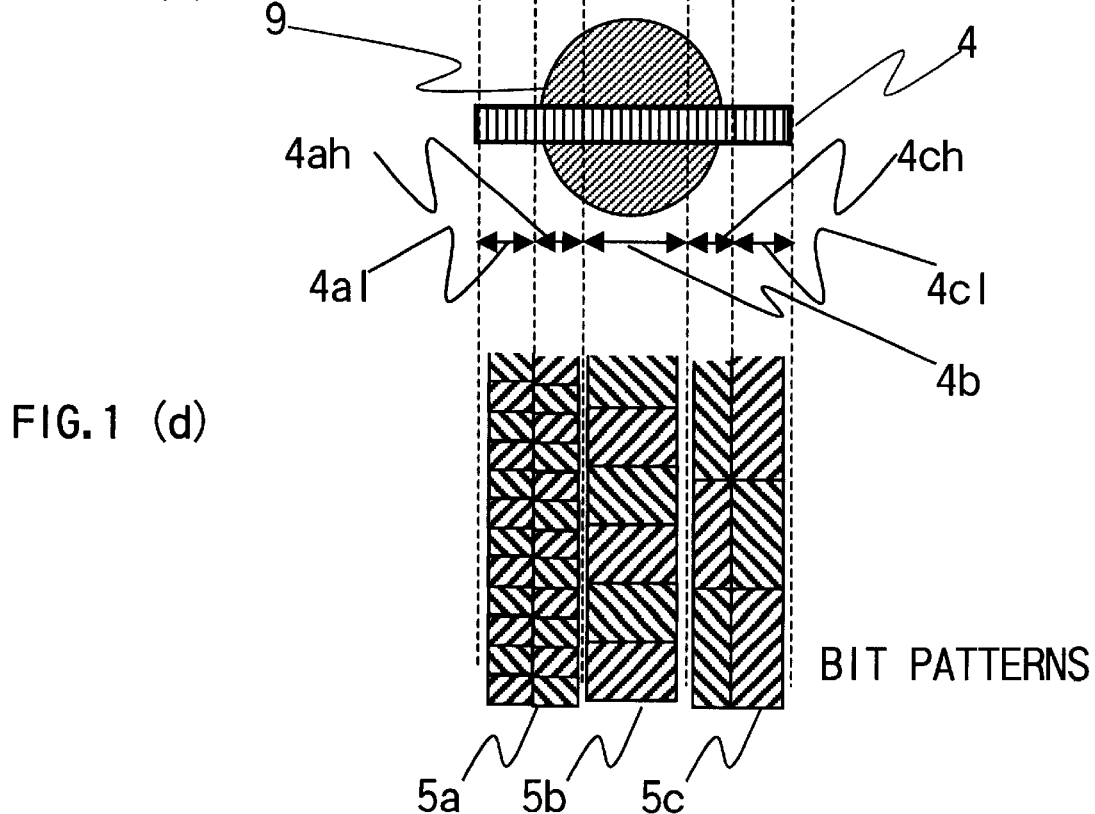
FIG. 1(c)
FIG. 1(d)

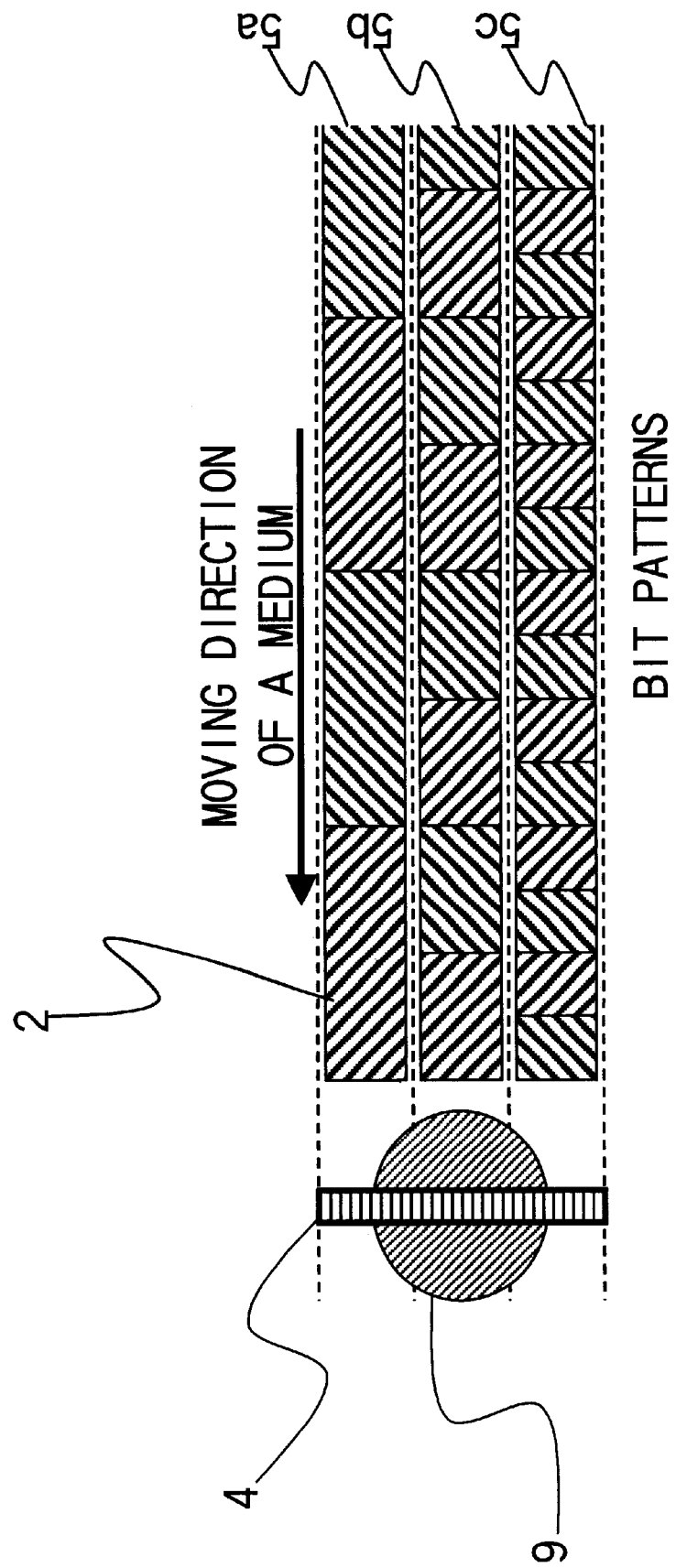

SENSITIVITY OF
A MAGNETIC HEAD

POSITION

TEMPERATURE

Tcomp

CENTER OF A
LASER SPOT

POSITION

BIT PATTERNS

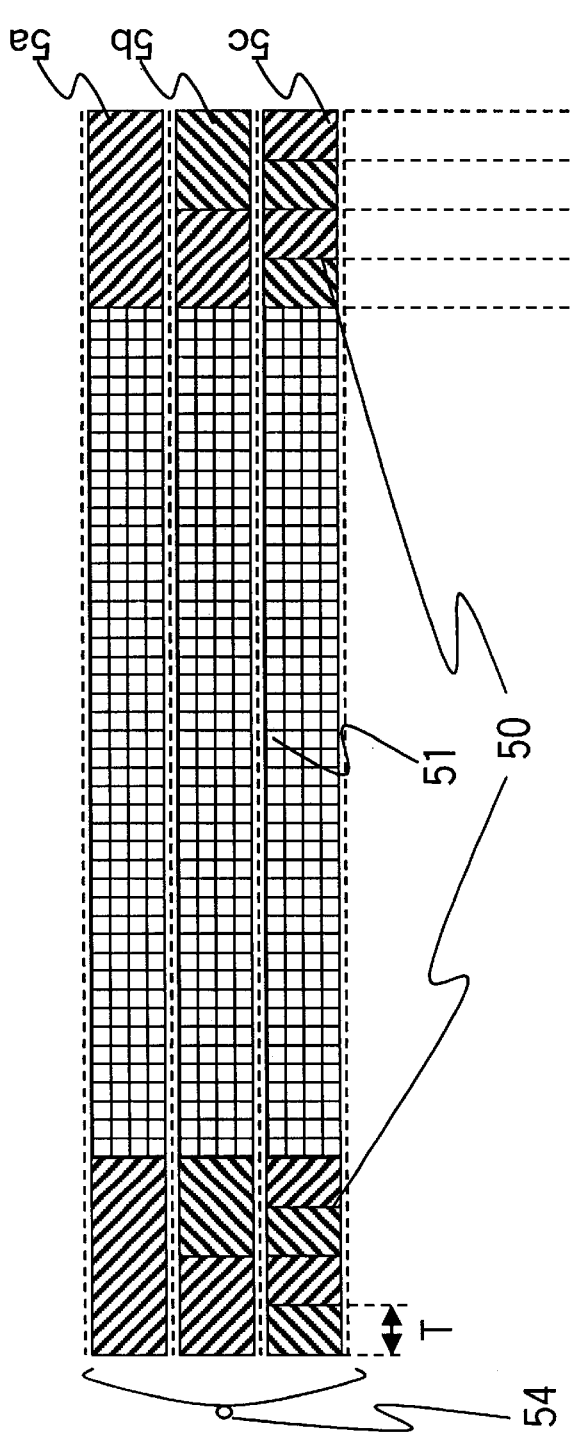
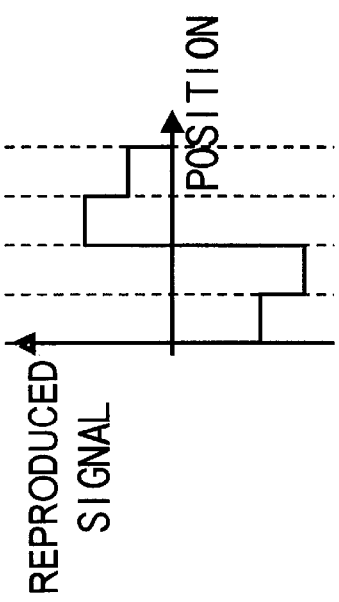
FIG. 10 (a)
FIG. 10 (b)

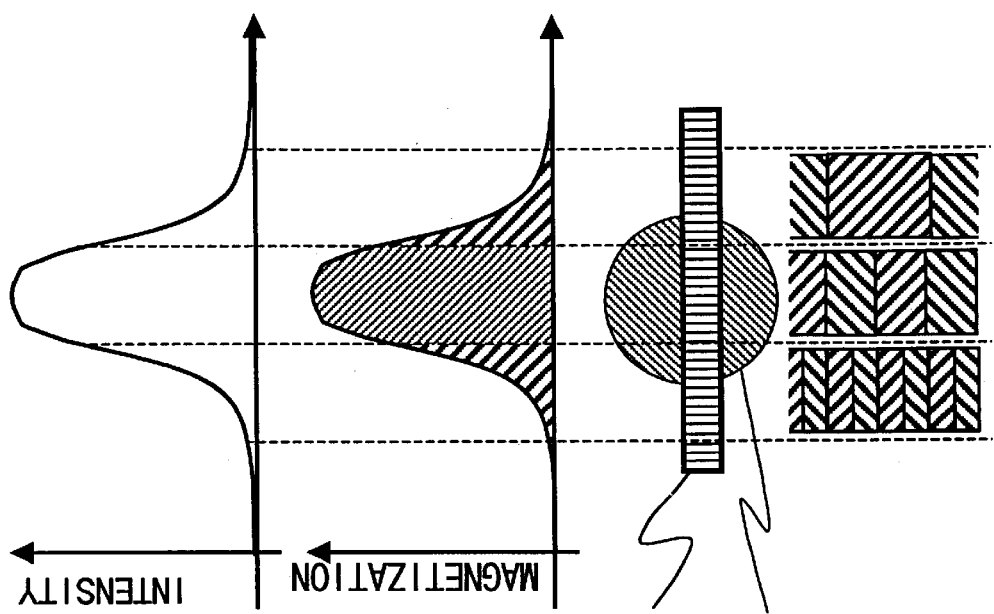
FIG. 22 (b) PRIOR ART
TRACK PITCH < WIDTH OF A TEMPERATURE DISTRIBUTION
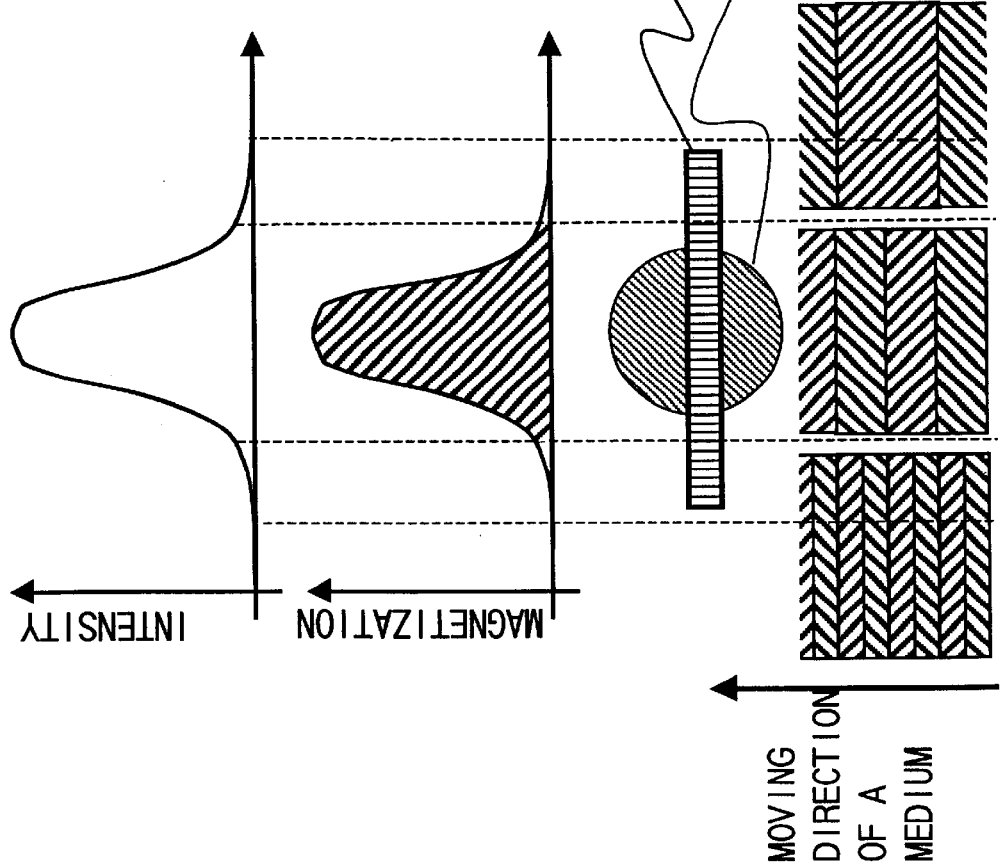
FIG. 22 (a) PRIOR ART
TRACK PITCH > WIDTH OF A TEMPERATURE DISTRIBUTION

MAGNETIC SIGNAL REPRODUCING DEVICE, MAGNETIC SIGNAL REPRODUCING METHOD AND MAGNETIC RECORDING MEDIUM FOR HIGH DENSITY REPRODUCTION

CROSS-REFERENCES TO RELATED APPLICATION

This application is related to Japanese patent application No. Hei 11(1999)-169337 filed on Jun. 16, 1999, whose priority is claimed under 35 USC §119, the disclosure of which is incorporated herein by reference in its entirety.

BACKGROUND OF THE INVENTION

1. Field of the Invention

The present invention relates to a magnetic signal reproducing device, a magnetic signal reproducing method and a magnetic recording medium which implements high density reproduction by magnetically carrying out reproduction while raising the temperature of a recording medium.

2. Description of the Related Art

In recent years, a multimedia technology has been developed and a memory device having a larger capacity has been required to process information having a larger capacity. In particular, a high density recording technology mainly including a writable optical disk, a magnetic disk and a magnetic tape has been investigated vigorously.

There has been proposed a magnetic signal recording and reproducing method capable of carrying out high density recording and reproduction by locally providing a temperature raising area on a medium through light irradiation or the like using a magnetic recording medium having magnetic properties changed depending on a temperature and recording or reproducing only the temperature raising area selectively and magnetically (the method will be referred to as a thermal assist magnetic signal recording and reproducing method which will be hereinafter referred to as a thermal assist magnetic signal reproducing method in this application).

As an example of the thermal assist magnetic signal recording and reproducing method, there has been proposed a method of irradiating a light beam on an area of a recording medium where recording is to be carried out, raising a temperature to the vicinity of a Curie temperature and applying an external magnetic field by means of a recording head to record information during recording and of irradiating a light beam on an area of the recording medium where reproduction is to be carried out and raising a temperature to increase the magnetization of a reproducing portion, detecting a leaking magnetic flux by means of a reproducing head to reproduce the information during reproduction by using, as the recording medium, a ferrimagnetic substance having a temperature at which the magnetization is set to be zero in the vicinity of a room temperature (which will be referred to as a magnetic compensation temperature in this application) (Japanese Laid-Open Patent Publication No. Hei 4-176034).

In the conventional thermal assist magnetic signal reproducing method (Japanese Laid-Open Patent Publication No. Hei 4-176034), however, the magnetization is generated from all the areas in which the temperature of the recording medium is raised. Therefore, if the reproduction is to be carried out in a smaller area than the temperature raised area, the undesirable magnetization signal is mixed into a reproducing signal. As compared with a signal obtained in an area to be reproduced, the mixed signal should be small enough. For this reason, the reproduction area of an allowable range cannot be reduced.

More specifically, in the conventional thermal assist magnetic signal reproducing method, if a signal reproducing area width is smaller than a temperature raising area width in order to increase a storage density, the S/N ratio of the reproducing signal is decreased. A typical example will be described below.

It will be supposed that magnetized information (signal) recorded on a magnetic recording medium by causing negative and positive polarities of magnetizations to correspond to binary is reproduced by the thermal assist magnetic signal reproducing method using reproducing means (hereinafter referred to as a reproducing head) having a general rectangular magnetized information detecting area. FIG. 20 is a diagram typically showing a magnetized information detecting area 4 of the reproducing head and a temperature raising area 9 formed on a medium by means of a locally temperature raising device (for which a laser beam is used).

FIG. 20 shows magnetized information about three areas 5a, 5b and 5c which are magnetized into three different kinds of patterns and are recorded. A state in which the magnetic recording medium is magnetized with polarities which are alternately reverse to each other is represented by the direction of a hatching. A bit pattern in which a series of information are recorded with the polarity of the magnetization will be hereinafter referred to as a track 5. In this example, the magnetized information are present on three tracks, that is, one track (5b) in the center and one track (5a, 5c) at each side.

It will be supposed that the magnetized information of one track (5b) in the center of a medium having the magnetized information recorded thereon is reproduced by means of a reproducing head (for example, an MR head or the like) including the magnetized information detecting area 4 having a larger width than one track width in the direction of the track width.

It is assumed that the magnetic recording medium is kind of a n-type ferrimagnetic substance having a magnetic compensation temperature almost equal to a medium temperature in the vicinity of a portion provided under the reproducing head in a state in which the temperature is not raised. FIG. 21 shows the temperature characteristic of the magnetization of the magnetic recording medium The widths of the tracks 5a, 5b and 5c are almost equal to each other and distances between the adjacent tracks are almost equal to each other. The sum of the width of the track and the distance between the tracks will be referred to as a track pitch. The recording density of the magnetic recording medium is inversely proportional to the track pitch.

The temperature of the magnetic recording medium is almost constant in the thickness direction. A length in the track direction of the magnetized information detecting area 4 of the reproducing means is smaller than the spread of a temperature distribution. Therefore, the temperature is almost constant at the magnetically detectable area along the track direction. Only the temperature distribution in the track width direction in a reproduction-related area contributes to a reproducing signal. Hereinafter, only the distribution in the track width direction in the above-mentioned reproduction-related area will be used for the temperature distribution related to the detection of magnetized information.

In the case where only the central track 5b shown in FIG. 20 is reproduced by the thermal assist magnetic signal reproducing method, the temperature of only the central track 5b is raised through a light beam or the like. At this time, the light beam causes the magnetic recording medium to have a temperature distribution shown in FIG. 3. A magnetization is induced according to the temperature distribution. A portion of the magnetic recording medium in which the area 9 having the temperature raised overlaps the reproduction-related area scanned by the magnetized information detecting area 4 of the reproducing head for magnetization detection will be hereinafter referred to as a reproduction portion. If only the central track 5b is present in the reproduction portion, the magnetized information about only the central track 5b can be reproduced. When the temperature raising area 9 using the light beam and the magnetized information detecting area 4 of the reproducing head are moved along the track 5 with relative positions thereof almost fixed, all the magnetized information of the central track 5b can be detected.

FIGS. 22(a) and 22(b) are charts showing a width of the temperature raising area 9 in the track width direction and a difference in a magnetizing signal depending on the track width. FIG. 22(a) shows the case in which the width of the temperature raising area 9 is smaller than the track width, and FIG. 22(b) shows the case in which the width of the temperature raising area 9 is greater than the track width.

If the width of the temperature raising area 9 is smaller than the track width (FIG. 22(a)), the reproducing signal is almost occupied by a signal sent from the central track 5b and a mixed signal is rarely sent from the adjacent tracks 5a and 5c. On the other hand, in the case in which the width of the temperature raising area 9 is greater than the track width (FIG. 22(b)), a signal sent from the adjacent tracks 5a and 5c is greatly mixed in the reproducing signal. When the mixed signal becomes great to some extent, the magnetized information of the central track 5b cannot be reproduced correctly.

Accordingly, it is necessary to reduce the width of the temperature raising area 9 in the magnetic recording medium in order to decrease a track pitch while reducing the mixed signal for magnetized information reproduction with a higher density, which is very difficult. In the thermal assist magnetic signal reproducing method which has been conventionally proposed, it is impossible to decrease the track pitch while reducing the mixed signal sent from the adjacent tracks.

Also in a laser beam for converging and irradiating coherent light which is one of temperature raising means, a light intensity distribution thereof has a spread equal to or larger than a wavelength and a heat distribution has a greater width, which has been hard to suppress.

In the thermal assist magnetic signal reproducing method, moreover, the temperature of the magnetic recording medium facing the magnetized information detecting area 4 of the reproducing head during the reproduction should be almost equal to the magnetic compensation temperature during non-temperature raising. However, the temperature of an environment in which the device is put has a variation of several tens °C. depending on seasons and time and electronic parts in the device generate heat. Moreover, heat is generated in a very small area, that is, the reproducing head generates heat. All the changes of heat influence the temperature of the magnetic recording medium. Therefore, in order to make the temperature of the reproduction-related area of the magnetic recording medium during the non-temperature raising almost equal to the magnetic compensation temperature, the temperature of a very small area, that is, the reproduction-related area of the magnetic recording medium of the reproducing head should be measured and controlled, which is very hard and cannot be solved at an actual cost.

SUMMARY OF THE INVENTION

It is an object of the present invention to solve the above-mentioned problems in the conventional thermal assist magnetic signal reproducing method and to provide a magnetic signal reproducing device, a magnetic signal reproducing method which can reduce a mixed signal in signal reproduction with a track pitch smaller than the diameter of a laser spot, can implement, at a high S/N ratio, magnetic signal reproduction having a higher density than that in the conventional thermal assist magnetic signal reproducing method and can correspond to a temperature transition of a magnetic recording medium with a change in an environment temperature or the like, and the magnetic recording medium.

The present invention provides a magnetic signal reproducing device for reproducing information from a magnetic recording medium in which a polarity of magnetization is inverted at a first temperature as a boundary during temperature raising, the device comprising: local temperature raising means for locally raising the temperature of the magnetic recording medium; and reproducing means having a magnetized information detecting area for magnetically detecting information recorded on the magnetic recording medium, wherein, during a reproducing operation, the local temperature raising means forms an area having a lower temperature than the first temperature and an area having a higher temperature than the first temperature within an area in the magnetic recording medium which area is opposed to the magnetized information detecting area, thereby reducing contribution to reproduced signal from magnetization of an area other than a reproduction target area.

According to the present invention, the contribution of the magnetized information to the reproducing signal in the temperature raising area in the magnetized information detecting area of the reproducing means can be decreased, and furthermore, can be offset. Therefore, when the magnetized information within a smaller range than the temperature raising area is to be detected, the mixed information can be reduced and the magnetized information can be detected at a high S/N ratio.

This object as well as other objects, features and advantages of the invention will become more apparent to those skilled in the art from the following description with reference to the accompanying drawings.

BRIEF DESCRIPTION OF THE DRAWINGS

FIGS. 1(a) to 1(d) are diagrams illustrating a high density reproducing principle according to a first embodiment of the present invention;

FIG. 2 is a diagram showing a positional relationship between a bit pattern of a magnetic recording medium and a magnetization detecting area and a laser spot according to the first embodiment;

FIGS. 10(a) and 10(b) are diagrams illustrating a laser beam power control area;

FIGS. 22(a) and 22(b) are charts illustrating the principle of a conventional thermal assist magnetic signal reproducing method.

DETAILED DESCRIPTION OF THE PREFERRED EMBODIMENTS

Figure 3:
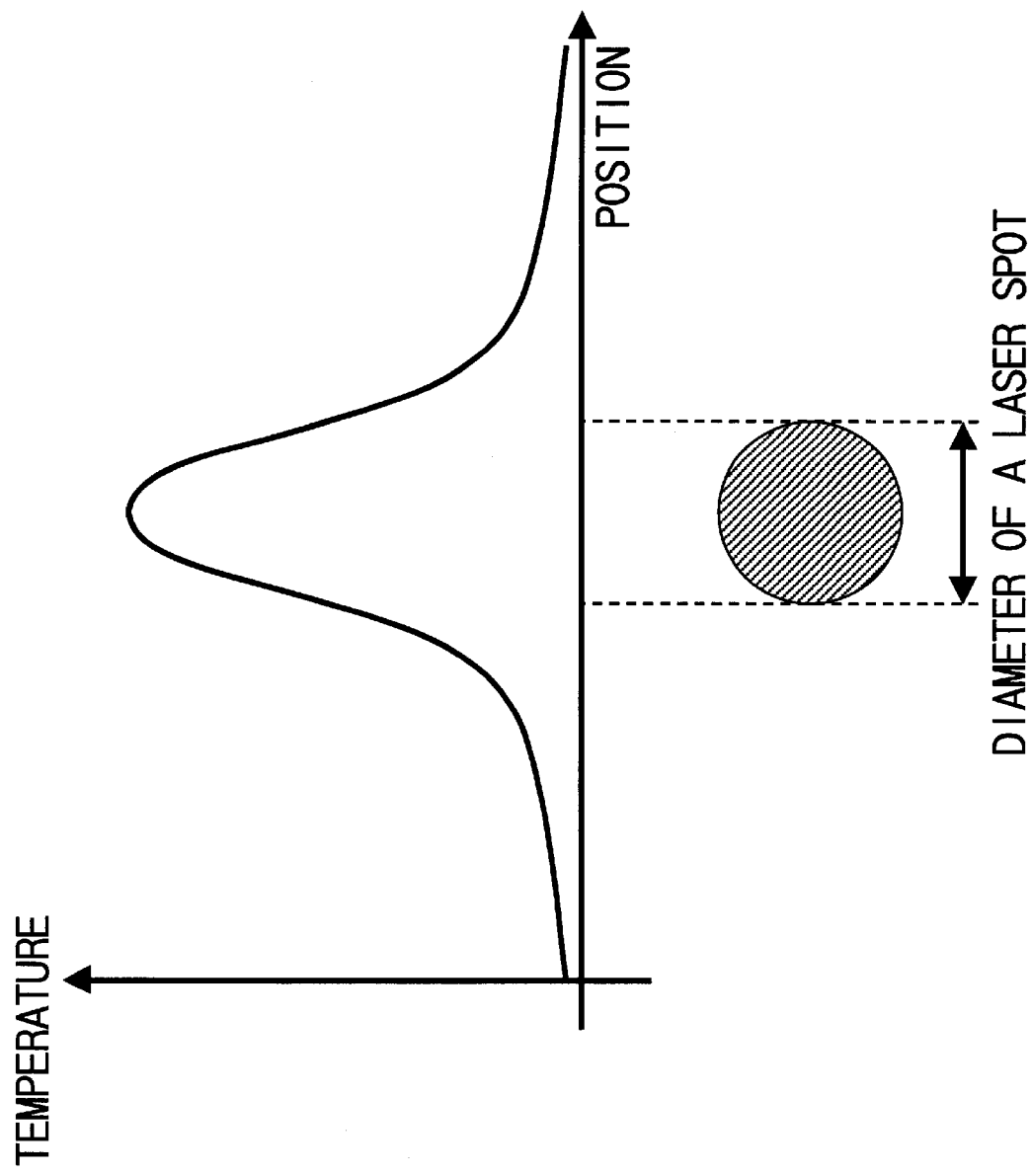
FIG. 3 is a chart illustrating a temperature distribution formed on the magnetic recording medium by irradiation on the laser spot.

In the present invention, a magnetic recording medium may have such a structure that the polarity of magnetization is inverted at a first temperature as a boundary during temperature raising (heating). However, if the first temperature is near the room temperature, it is hard to form an area having a lower temperature than the first temperature by using only local temperature raising (spot heating) means. On the other hand, if the first temperature is near the Curie temperature of the magnetic recording medium, magnetized information might be unstable and be eliminated when an area having a higher temperature than the first temperature is formed. Examples of the magnetic recording medium in which the polarity of magnetization is inverted on the first temperature as the boundary include an n-type ferrimagnetic substance such as TbFeCo or GdFeCo. In these substances, the first temperature is generally referred to as a magnetic compensation temperature. The magnetic compensation temperature varies depending upon the composition ratio, for example, of Tb, Fe and Co. In particular, it is desirable to choose a composition ratio near 21% of Tb, 66% of Fe and 13% of Co because this magnetic substance has a magnetic compensation temperature of about 100° C. and a Curie temperature of 250° C.

It is possible to use any local temperature raising means which can locally raise the temperature of the magnetic recording medium It is desirable that a laser beam should be used since the temperature of the magnetic recording medium can locally be raised instantaneously.

Preferably, reproducing means has a magnetized information detecting area for magnetically detecting information (magnetic signal) recorded on the magnetic recording medium and is arranged such that at least part of the portion having the temperature raised by the local temperature raising means is opposed to the magnetized information detecting area. Since the magnetized information is recorded on the magnetic recording medium as a magnetized state of the magnetic recording medium, the magnetized information detecting area may usually include an element which detects a leakage magnetic field from the magnetic recording medium. Accordingly, the reproducing means may have a magnetic reproducing element such as a magnetic reluctance element which is known in this field, for example, and is provided such that at least a part of the portion having the temperature raised by the local temperature raising means such as a laser beam is opposed to the magnetic reproducing element. The reproducing means includes a signal processing device for converting a signal obtained from the magnetic reproducing element into a video signal, a voice signal or a signal for information processing.

In the present invention, it is important that the area having the lower temperature than the first temperature and the area having the higher temperature than the first temperature are formed in the area opposed to the magnetic reproducing element of the magnetic recording medium during a reproducing operation by the local temperature raising means such as a laser beam.

It is desirable that the areas having the lower and higher temperatures than the first temperature should be formed on an area other than the reproduction target area of the magnetic recording medium, that is, a track adjacent to a reproduction target track, for example. If the area having lower and higher temperatures than the first temperature are thus formed on the adjacent track, the areas having the lower and higher temperatures take different polarities of magnetization and positive and negative magnetization is generated in the adjacent track. Thus, the magnetic reproducing element captures opposite magnetic fields from the adjacent track, and consequently the adjacent track as a whole affects less a signal obtained by the magnetic reproducing element. In particular, if the positive and negative magnetization of the adjacent track are set to be offset each other (the absolute values of contributions to reproduced signal from the positive and negative magnetizations are almost equal to each other), a mixed signal sent from the adjacent track can be set almost "0". For this purpose, it is desirable that the temperature of the adjacent track should be raised such that the average temperature of the adjacent track almost reaches the magnetic compensation temperature.

If the laser beam is used for the local temperature raising means, for example, the areas having the lower and higher temperatures than the first temperature can be formed by properly setting the light irradiating area of the laser beam and the power of the laser beam.

It is desirable that the irradiating area of the laser beam should be set such that the center of a laser spot is positioned on the center of the magnetic reproducing element and should be adjusted such that the center of the laser spot should be positioned on the center of the reproduction target track. By such adjustment, the areas having the lower and higher temperatures than the first temperature can be formed accurately on the adjacent track, for example.

It is desirable that the power of the laser beam should be set to heat the track other than the reproduction target (for example, the adjacent track) such that the areas having the lower and higher temperatures than the first temperature are formed on the same track. It is more desirable that the power should be set to heat the track other than the reproduction target so that the magnetic effect from the track on the magnetic reproducing element is almost "0", more specifically, the average temperature of the track other than the reproduction target reaches the vicinity of the first temperature. This can be implemented in the following manner.

For example, the power of a laser beam implementing such a temperature raising state that the average temperature of the track other than the reproduction target reaches the vicinity of the first temperature is stored as standard power and the standard power is read to control the power of the laser beam during reproduction. Alternatively, the standard power is stored in the magnetic recording medium and is read from the magnetic recording medium to control the power of the laser beam during the reproduction.

In order to cope with a change in an environment temperature, the power of the laser beam is reduced if the environment temperature is raised, and the power of the laser beam is increased if the environment temperature is lowered. Thus, the average temperature of the track other than the reproduction target should reach the vicinity of the first temperature. Preferably, the adjustment of the power of the laser beam with a change in the environment temperature is carried out based on the temperature of the magnetic recording medium (or the environment temperature) detected through a thermistor or the like.

Further, known magnetized information may be recorded beforehand in a known site on the magnetic recording medium. The temperature of the magnetic recording medium may be related to a signal detected by the reproducing element when reading the known magnetized information and the obtained relationship may be stored. At reproduction, a difference between the average temperature of the track other than the reproduction target track and the first temperature may be calculated, and the power of the laser beam may be so adjusted to correct the difference with reference to the stored relationship.

[First Embodiment]

In this embodiment, explained is a magnetic signal reproducing device which heats a magnetic recording medium using a laser beam and reproduces magnetized information by a reproducing head (reproducing means) having a magnetized information detecting area arranged facing at least a part of a heated portion of the magnetic recording medium. The magnetic signal reproducing device of the present embodiment is now explained in the following order:

(1) Principle
(2) Structure of Apparatus
(3) Setting of Laser Beam Power
(4) Working condition of Magnetic Recording Medium (Design of Magnetic Recording Medium)
(5) Tracking Control
(6) Others.

(1) Principle

First of all, description will be given to the principle of a thermal assist magnetic signal reproducing system (a thermal assist magnetic signal reproducing method and device and a magnetic recording medium) according to the present embodiment.

In the magnetic recording medium to be used for the present embodiment, the polarity of a magnetization is changed at the first temperature in the middle of temperature raising. For example, the magnetic recording medium comprises a magnetic layer having a magnetic compensation temperature (Tcomp; for example, approximately 100° C.) between a room temperature (T1) and a Curie temperature (Tc) as shown in FIG. 5.

Figure 5:
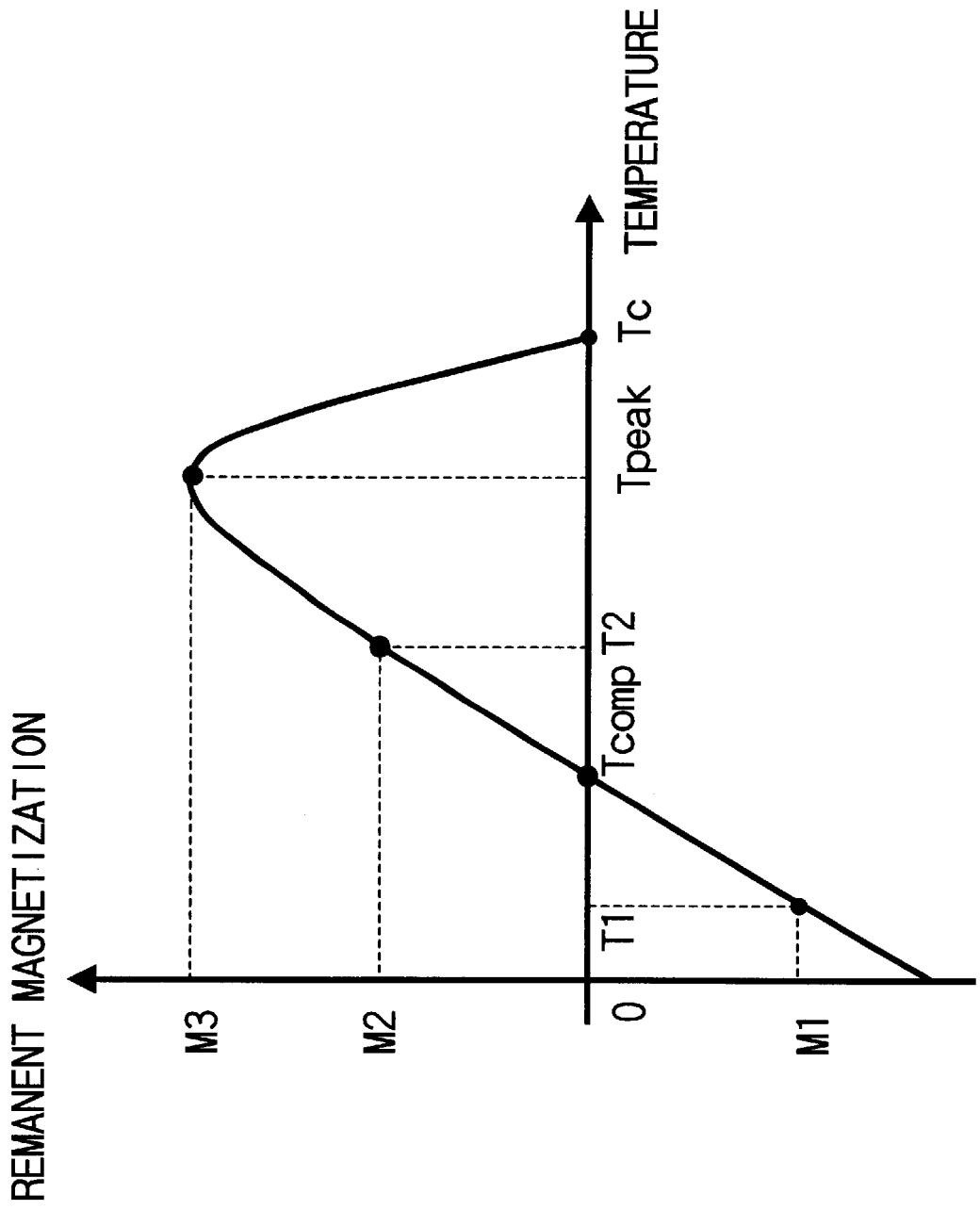
FIG. 5 is a chart showing a magnetic characteristic of the magnetic recording medium according to the first embodiment.

Such a magnetic recording medium has a magnetization set to be approximately zero at a temperature in which the polarity is changed (the magnetic compensation temperature Tcomp in the magnetic recording medium of FIG. 5) and has a magnetization in opposite directions at lower and higher temperatures. In the thermal assist magnetic signal reproducing system according to the present embodiment, the temperature of the magnetic recording medium is raised such that the areas having the higher and lower temperatures than the polarity changed temperature are formed in the reproduction relating area of the magnetic recording medium (an area provided under the magnetized information detecting area of a reproducing head in which magnetized information is read) during the reproduction. Consequently, high density storage is implemented. The principle of the present embodiment will be described below in detail with reference to FIGS. 1 and 2.

FIGS. 1(a) to 1(d) illustrate the principle of the present invention, and FIG. 2 is a diagram showing a positional relationship between a bit pattern recorded on a magnetic recording medium and the magnetized information detecting area of the reproducing head (in which the magnetization of the magnetic recording medium is detected) and a laser spot. In these drawings, the magnetic recording medium 2 describes only three tracks 5a, 5b and 5c.

In FIGS. 1(a) to 1(d) and FIG. 2, a laser spot 9 converges and irradiates a laser beam in almost the center of the central track 5b (reproduction target track (reproduction target area)) on the magnetic recording medium 2. Consequently, a temperature distribution shown in FIG. 3 (or FIG. 1(a)) is formed. On the other hand, a magnetized information detection sensitivity in the magnetized information detecting area 4 of the reproducing head is constant in the magnetized information detecting area of the reproducing head, and the reproducing signal is proportional to a value obtained by integrating a product of a magnetization per unit area of the magnetic recording medium 2 included in the same area and the detection sensitivity of the reproducing head in the magnetized information detecting area of the reproducing head. The positive and negative signs of the polarity of the magnetization are equivalent to those of the magnetization.

Description will be given to an example in which information recorded on the central track 5b is reproduced by using the reproducing head and a laser beam (laser spot) in the case in which the magnetized information detecting area 4 of the reproducing head has a width for three tracks (5a, 5b, 5c) of the magnetic recording medium 2 and a leaking magnetic flux influencing the reproducing signal is generated from a larger area than a width for one track through an irradiating laser spot 9 as shown in FIG. 2. Areas of the magnetic recording medium 2 between the tracks are demagnetized.

As described in the related art, in the conventional thermal assist magnetic signal reproducing method, if the magnetized information detecting area 4 is provided over a plurality of tracks and an area where the leaking magnetic flux is generated (a temperature raising area) is also provided over the tracks as shown in FIG. 2, information recorded on the reproduction target track (central track 5b) and the adjacent tracks (5a, 5c) are also mixed as a signal from the magnetized information detecting area 4. Consequently, the quality of the reproducing signal is deteriorated.

In the present embodiment, the above-mentioned magnetic recording medium is used (in which Tcomp is between a room temperature and a Curie temperature as shown in FIG. 1(a)), and the temperature of a reproduction relating area 4b of the central track 5b (a portion provided under the magnetized information detecting area 4 of the central track 5b) is made higher than Tcomp through laser beam irradiation around the central track 5b during the reproduction. At this time, the temperature of the portion provided under the magnetized information detecting area 4 of the adjacent tracks 5a and 5c is raised such that areas having higher temperatures than Tcomp (reproduction relating areas 4ah and 4ch) and areas having lower temperatures than Tcomp (reproduction relating areas 4al and 4cl) are formed.

FIG. 1(b) shows the state of a magnetization in the reproduction relating areas (4al, 4ah, 4ch, 4cl) of the magnetic recording medium 2 which is obtained when the temperature is raised as described above. FIG. 1(d) is a diagram showing, in the direction of a hatching, the positive and negative polarities of the magnetization appearing in the magnetic recording medium 2 when the bit pattern shown in FIG. 2 is reproduced. As is apparent from these drawings, the respective reproduction relating areas of the adjacent tracks 5a and 5c have magnetizations in the positive and negative directions.

Figure 4:
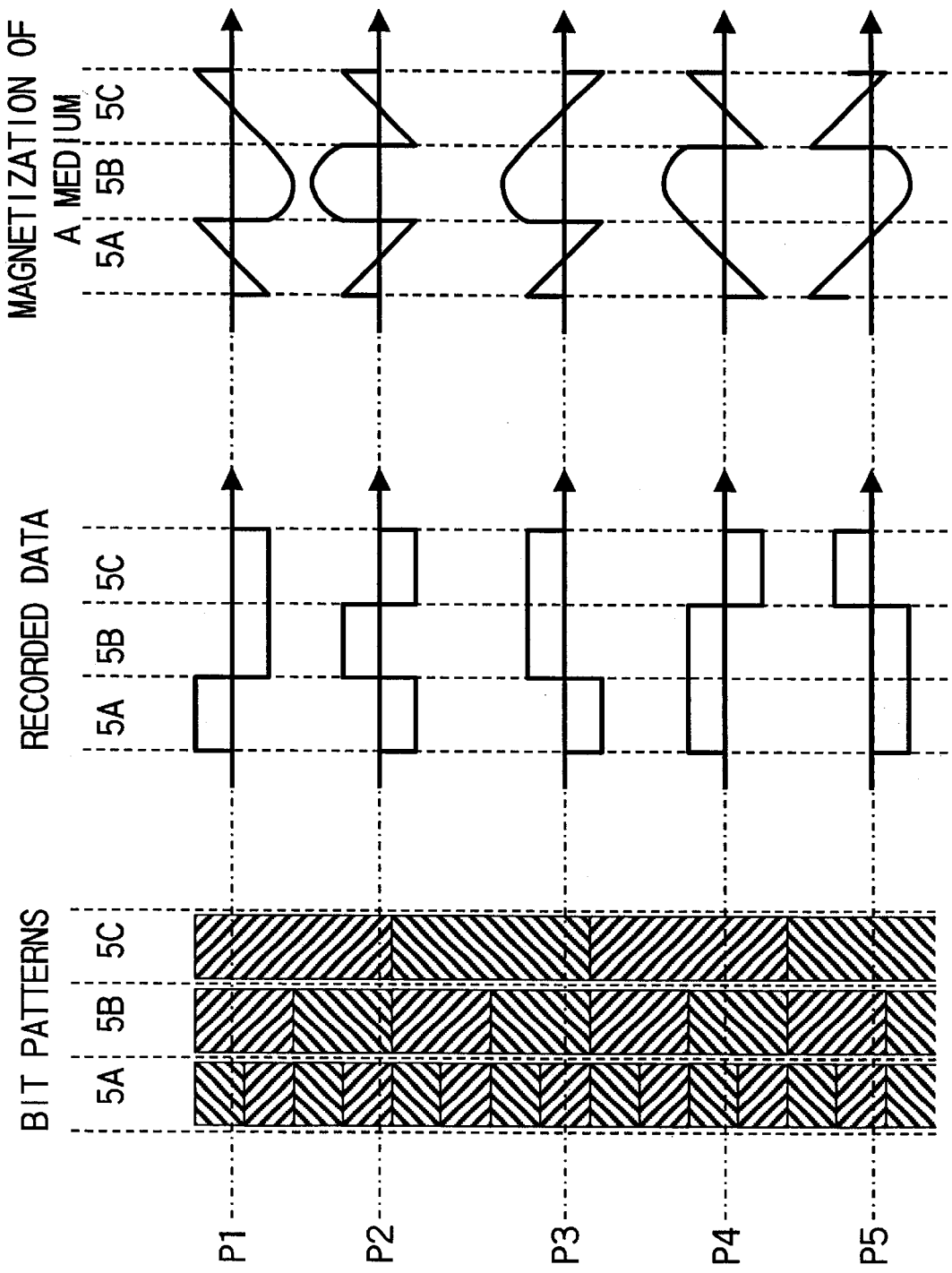
FIG. 4 is a diagram illustrating the bit pattern of the magnetic recording medium, a direction of a magnetization during recording and a magnetization obtained during reproducing temperature raising.

More detailed description will be given with reference to FIG. 4. FIG. 4 is a graph showing a direction of a magnetization during recording in positions P1, P2, P3 and P4 of the bit pattern shown in FIG. 2 and a magnetization induced during reproduction in those positions. In each of the positions, the polarity of the magnetization is inverted in the adjacent tracks 5a and 5c. More specifically, a lower temperature side has the negative polarity and a higher temperature side has the positive polarity in each track at both ends. The magnetizations having reverse polarities contribute to the reproducing signal in an inverse sign. Therefore, the magnetized signals from the track cancel each other and are decreased in their amplitude. In the position P1, for example, the magnetization in the positive direction is recorded on the track 5a and the magnetization in the negative direction is recorded on the tracks 5b and 5c during recording, while the track 5b has a large magnetization by a rise in the temperature to the magnetization compensation temperature or more and the tracks 5a and 5c have magnetizations in the positive and negative directions therein and the magnetization is wholly decreased (and furthermore, cancel as described below) during the reproduction of the track 5b.

According to the thermal assist magnetic signal reproducing system of the present embodiment, thus, the adjacent tracks 5a and 5c have the magnetizations in the positive and negative directions during the reproduction and a smaller magnetization is wholly obtained. Consequently, a signal sent from each of the adjacent tracks 5a and 5c has a small magnitude and a reproducing signal sent from the central rack 5b can be reproduced with high quality.

In the examples of FIGS. 1 and 4, if the positive and negative magnetizations induced in the adjacent tracks 5a and 5c during the reproduction are set to cancel each other (the absolute values of the positive and negative magnetizations are equal to each other), the signals sent from the adjacent tracks 5a and 5c can be set to be almost zero. More specifically, the magnetization of the magnetic recording medium 2 can approximate in the linear function of the temperature (see FIG. 5) within a temperature range corresponding to the adjacent tracks 5a and 5c. Therefore, if an average temperature in each track is raised to be almost equal to the magnetic compensation temperature Tcomp (for example, approximately 100° C.) of the magnetic recording medium 2, contribution to the reproducing signal of the magnetized information in the track is almost zero. In this case, it is possible to reduce the mixed signals from the adjacent tracks (the tracks on both ends) 5a and 5c by the spread of a temperature distribution. Consequently, magnetized information about only the central track 5b can be obtained as the reproducing signal. Thus, it is possible to detect, with high precision, the magnetized information with a smaller track width than the width of the temperature raising area formed on the magnetic recording medium 2.

The magnetized information detection sensitivity of the reproducing head 3 is constant in the magnetized information detecting area 4 and the magnetization of the magnetic recording medium 2 is represented by the linear function of the temperature in the vicinity of the magnetic compensation temperature. If not so, there is a laser power reducing the contribution to the reproducing signal from an area in which the polarities of the magnetization in either of the adjacent tracks 5a and 5c are reverse to each other. For example, in the case in which the magnetized information detection sensitivity of the reproducing head is not constant in the magnetized information detecting area 4, an average temperature obtained by weighting corresponding to the magnetized information detection sensitivity of the reproducing head may be used. In this case of weighting according to the magnetized information detection sensitivity of the reproducing head, in each of the adjacent tracks 5a and 5c, the absolute values of average magnetization in the areas having a lower temperature and a higher temperature than the magnetic compensation temperature are almost the same.

Figure 6:
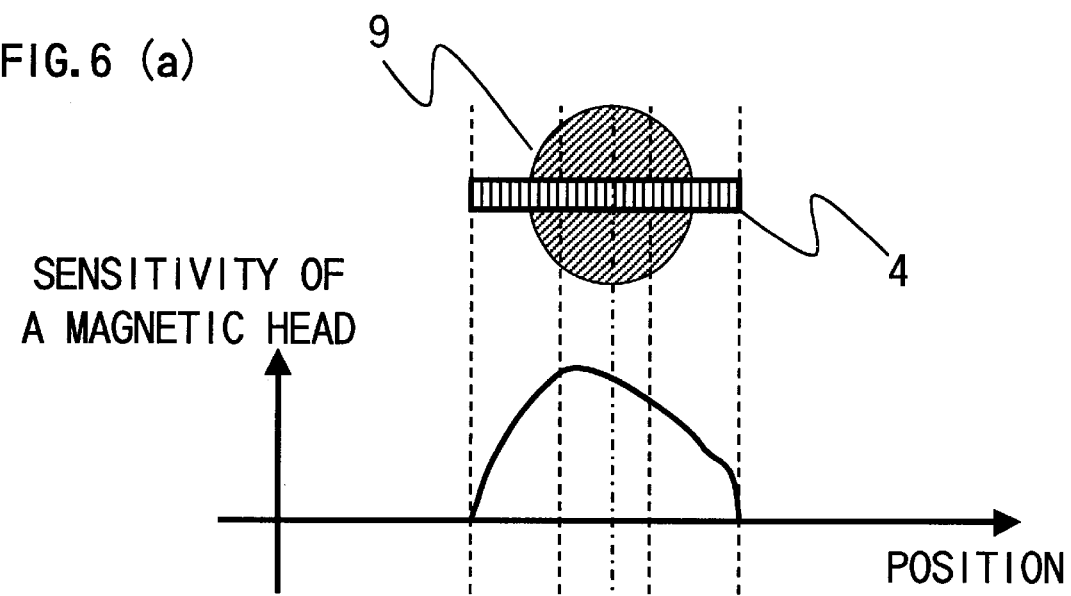
FIGS. 6(a) and 6(b) are charts illustrating a reproducing method with a magnetized information detection sensitivity having a distribution.
Figure 6:
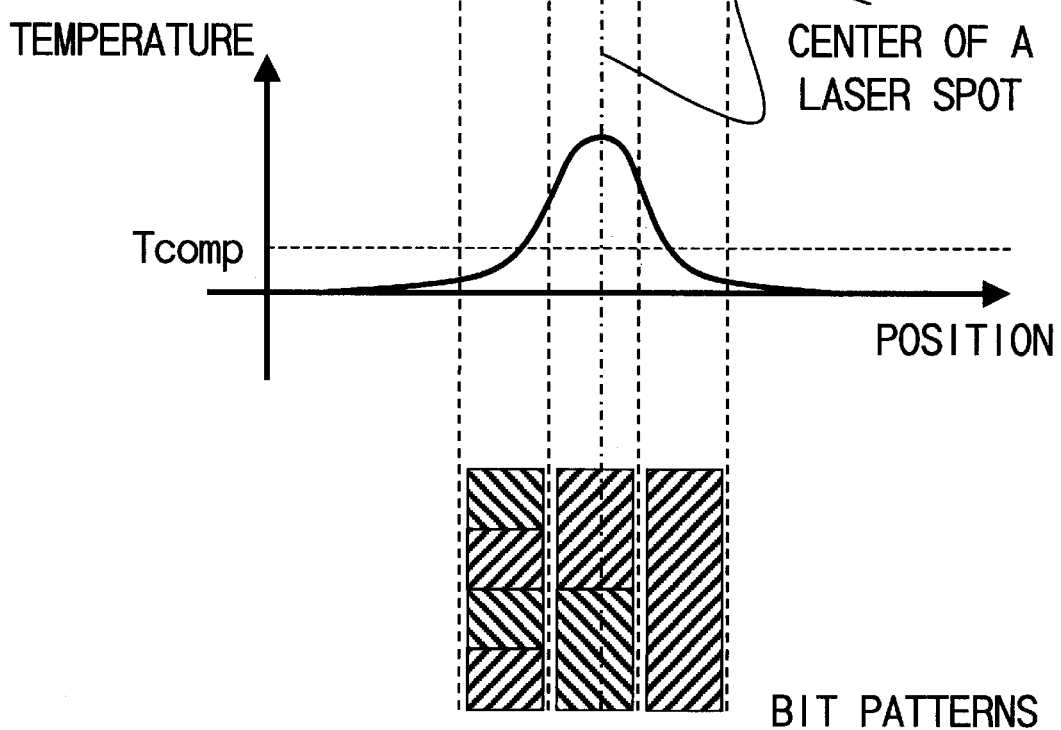

If the magnetized information detection sensitivity of the reproducing head and the temperature of the magnetic recording medium 2 are distributed almost symmetrically in the magnetized information detecting area 4 as in the present embodiment, the mixing signals from the adjacent tracks 5a and 5c in FIG. 2 can be reduced through the same laser beam power. In this case, if the center of the irradiation position of the laser spot is coincident with that of the track 5b, an adjacent area from which the mixing signals are reduced can be obtained at the maximum. For this reason, setting is carried out as described in the above example (FIG. 1 and the like). However, the distribution of the magnetized information detection sensitivity of the reproducing head is not restricted to that of the above case. FIG. 6 shows an example of the case in which the magnetized information detection sensitivity of the reproducing head is distributed asymmetrically in the magnetized information detecting area 4 (see FIG. 6(a)). In this case, when the position of the temperature distribution of the magnetic recording medium 2 (the center of the laser spot) is moved (see FIG. 6(b)), the mixing signals from the adjacent tracks in FIG. 2 can be reduced with the same laser beam power. The movement of the center of the laser spot can be carried out by the same method as tracking control which will be described below.

(2) Structure of Apparatus

The magnetic recording medium 2 to be used in the present embodiment is formed of an n-type ferrimagnetic substance having the above-mentioned structure (see FIG. 5) and a magnetic compensation temperature Tcomp of approximately 100° C. For example, TbFeCo, GdFeCo and the like can be used for the ferrimagnetic substance. In the present embodiment, a magnetic substance comprising TbFeCo having 21% of Tb, 66% of Fe and 13% of Co has been used. However, a magnetic substance containing 25% of Tb, 10% of Fe and 65% of Co or the like may be used.

Moreover, information is recorded on the magnetic recording medium 2 with a track width of 0.5 μm, a space between tracks of 0.1 μm and a track pitch of 0.6 μm corresponding to the positive and negative signs of the polarity of the magnetization as shown in FIG. 2. Areas between the tracks are demagnetized. The recording state of each track is almost uniform in the width direction,.

Figure 7:
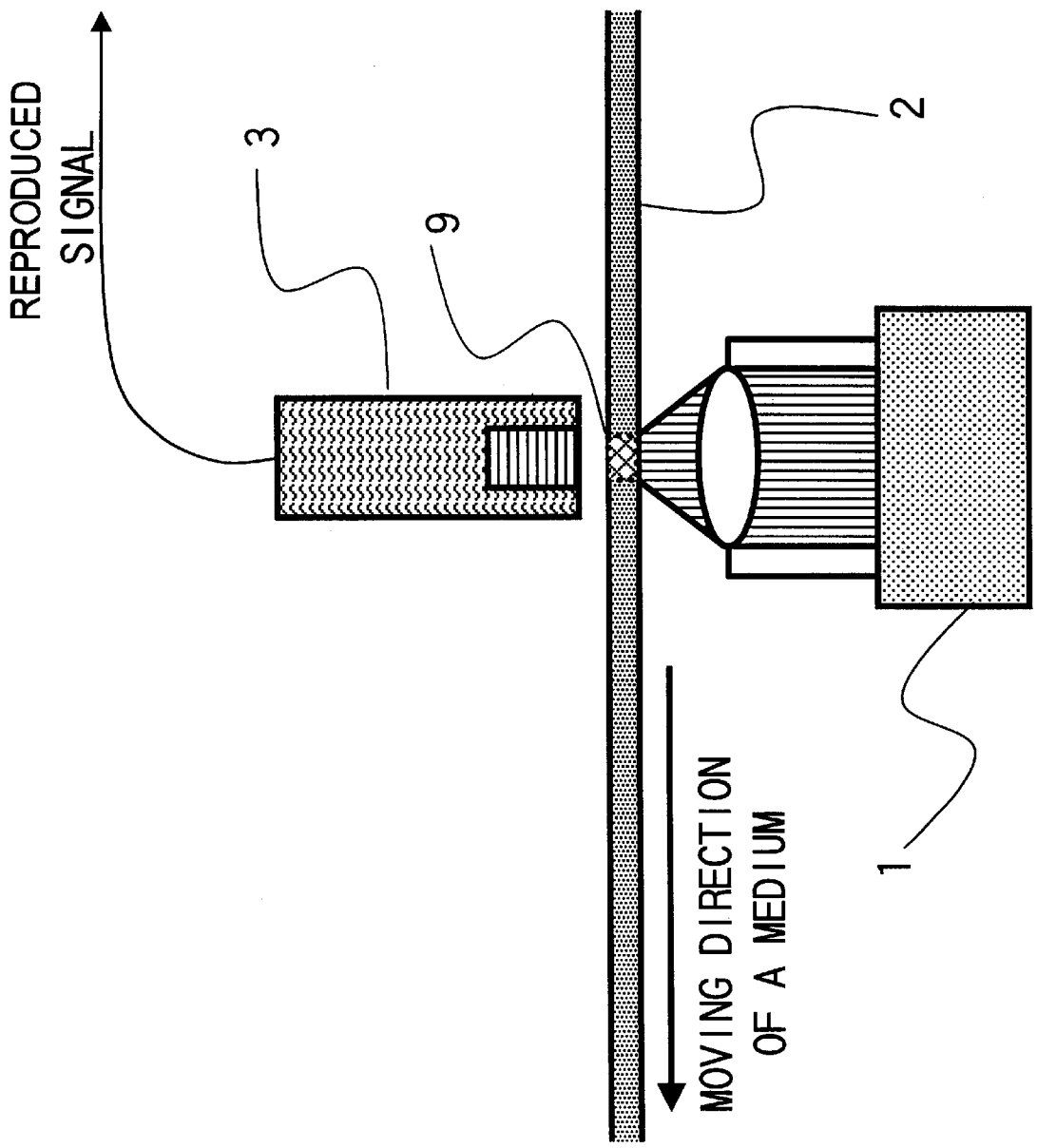
FIG. 7 is a schematic view showing the main structure of a magnetic signal reproducing device according to the first embodiment.
Figure 8:
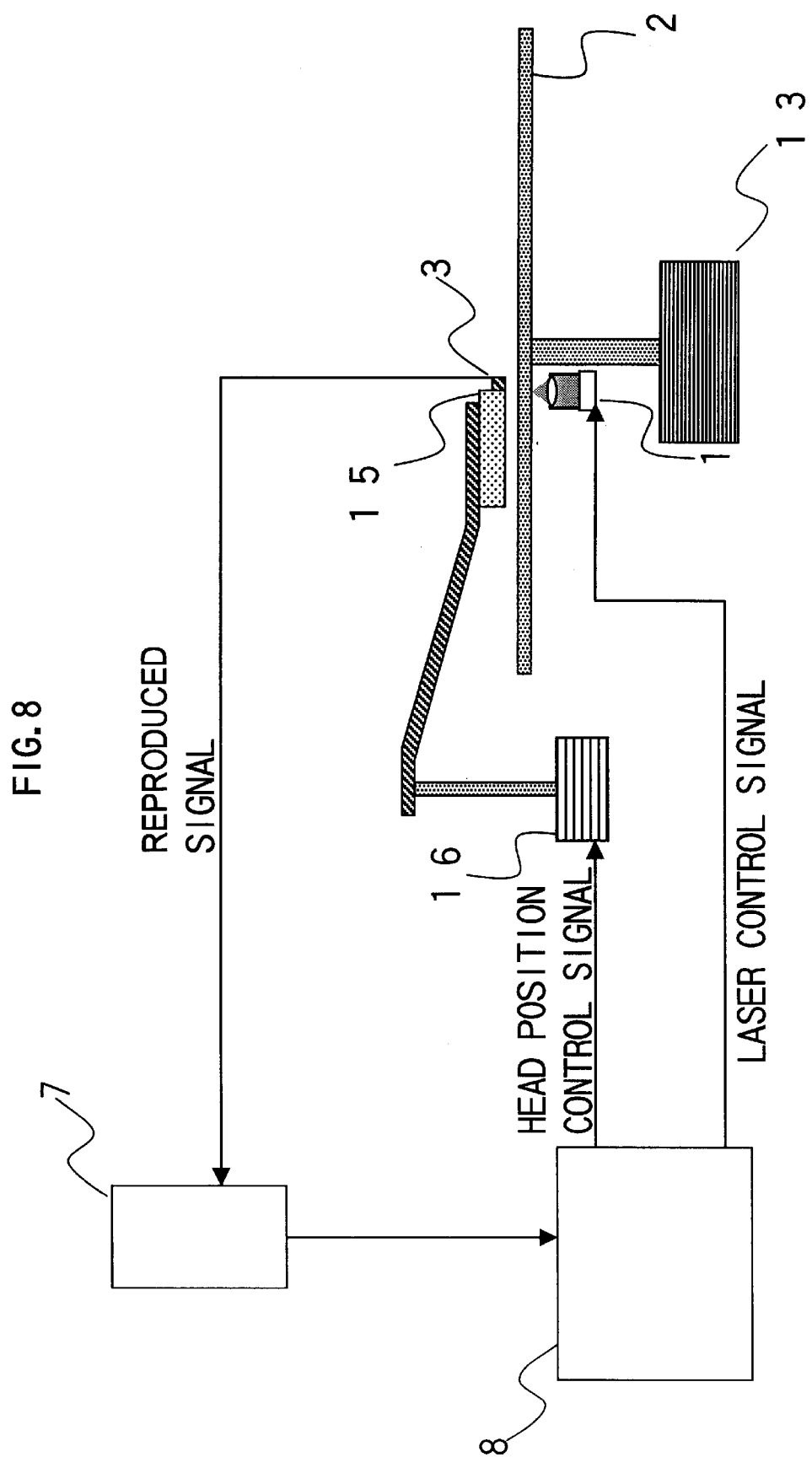
FIG. 8 is a schematic view showing the whole structure of the magnetic signal reproducing device according to the first embodiment.

The structure of the device will be described below with reference to FIGS. 7 and 8. FIG. 7 is an enlarged view showing a laser beam irradiating portion and a magnetic signal reproducing portion in the magnetic signal reproducing device, and FIG. 8 is a schematic view showing the whole structure of the magnetic signal reproducing device.

As shown in these drawings, a local temperature raising device 1 and a reproducing head 3 are provided with a magnetic recording medium 2 (having the characteristics of FIG. 5) therebetween. The local temperature raising device 1 converges and irradiates a laser beam on the magnetic recording medium 2 in response to a laser control signal sent from a controller 8. The reproducing head 3 is fixed to a reproducing head moving device 16 through a slider 15 and is provided to detect the magnetized information of the magnetic recording medium 2. Moreover, the reproducing head 3 can be moved to any magnetized information recording area in the magnetic recording medium 2 by means of a magnetic recording medium rotating device 13 and a reproducing head moving device 16. The reproducing head moving device 16 is driven in response to a reproducing head position control signal sent from the controller 8.

The reproducing head 3 has a magnetized information detecting area 4 having a width of 1.8 μm (for three tracks) and the local temperature raising device 1 serves to locally raise a temperature with a converged laser beam having a beam diameter of 1 μm.

A signal processor 7 converts the magnetized information detected by the reproducing head 3 into a signal processable by the controller 8, and outputs the same signal to the controller 8. The controller 8 has the function of outputting a laser control signal to the local temperature raising device 1 and a reproducing head position control signal to the reproducing head moving device 16 in response to a signal input from the signal processor 7.

A reproducing operation is carried out in the following manner. First of all, the magnetic recording medium rotating device 13 rotates the magnetic recording medium 2. Then, the temperature of the magnetic recording medium is raised by the local temperature raising device 1 and a magnetic flux sent from the temperature raising portion is read from the magnetized information detecting area of the reproducing head 3. The read signal is subjected to the above-mentioned processing through the signal processor 7. Consequently, information is reproduced. In this case, the control of laser beam power (which will be described below) is carried out by the controller 8, and tracking control (which will be described below) is executed.

(3) Setting of Laser Beam Power

As described in the item of "principle", in the thermal assist magnetic signal reproducing system according to the present embodiment, the direction of the magnetization of the magnetic recording medium 2 is inverted at the predetermined temperature (Tcomp in the present embodiment) during temperature raising, and the temperature of the magnetic recording medium 2 is raised such that the areas having higher and lower temperatures than the predetermined temperature are formed in the reproduction relating area of the magnetic recording medium 2 (which is provided under the magnetized information detecting area 4 of the reproducing head 3 and in which the magnetized information is read) during the reproduction. It is more desirable that the temperature of the magnetic recording medium 2 should be raised such that a magnetic flux sent from a track other than the reproduction target track is almost zero, more specifically, the average temperature of the adjacent tracks 5a and 5c reaches the vicinity of Tcomp.

In the thermal assist magnetic signal reproducing system according to the present embodiment, it is very important that the temperature raising state is controlled by the local temperature raising device 1. Even if the temperature is raised too high or low, a magnetic flux (magnetized information) sent from a track other than the reproduction target track is also read by the reproducing head 3. Consequently, the quality of the reproducing signal is deteriorated.

If the thermal assist magnetic signal reproducing device to be used can always hold the magnetic recording medium 2 at a constant temperature, laser beam power (standard power) for implementing the above-mentioned temperature raising state can be obtained in advance and adjustment can be carried out such that the laser beam power of the local temperature raising device 1 is set to be the standard power by the controller 8 during the reproduction. For example, (a) the standard power is stored in an internal memory provided in the thermal assist magnetic signal reproducing device and the controller 8 reads the standard power during the reproduction to perform the laser beam power control based on the standard power, (b) the standard power is stored in the predetermined area (for example, the inner or outer part of an information recording area) of the magnetic recording medium 2 and the laser beam power is controlled based on the standard power reproduced from the magnetic recording medium 2 during the reproduction.

However, even if the temperature is locally raised with the same laser beam power under usual working conditions, the magnetic recording medium 2 does not always have a desirable temperature due to a change in an environment temperature, a change in the linear speed of the magnetic recording medium 2 and the like. Accordingly, it is desirable that the laser beam power should be varied and adjusted to respond to these changes.

Figure 9:
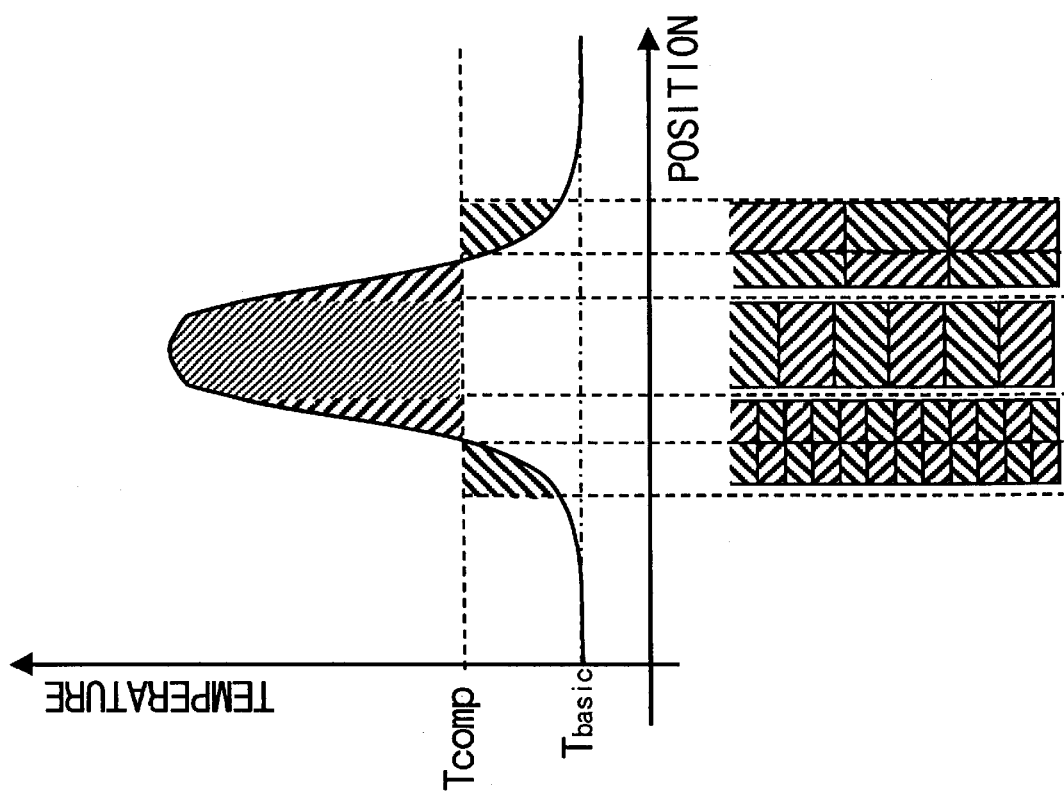
FIGS. 9(a) and 9(b) are charts illustrating a reproducing method during a change in a reference temperature.
Figure 9:
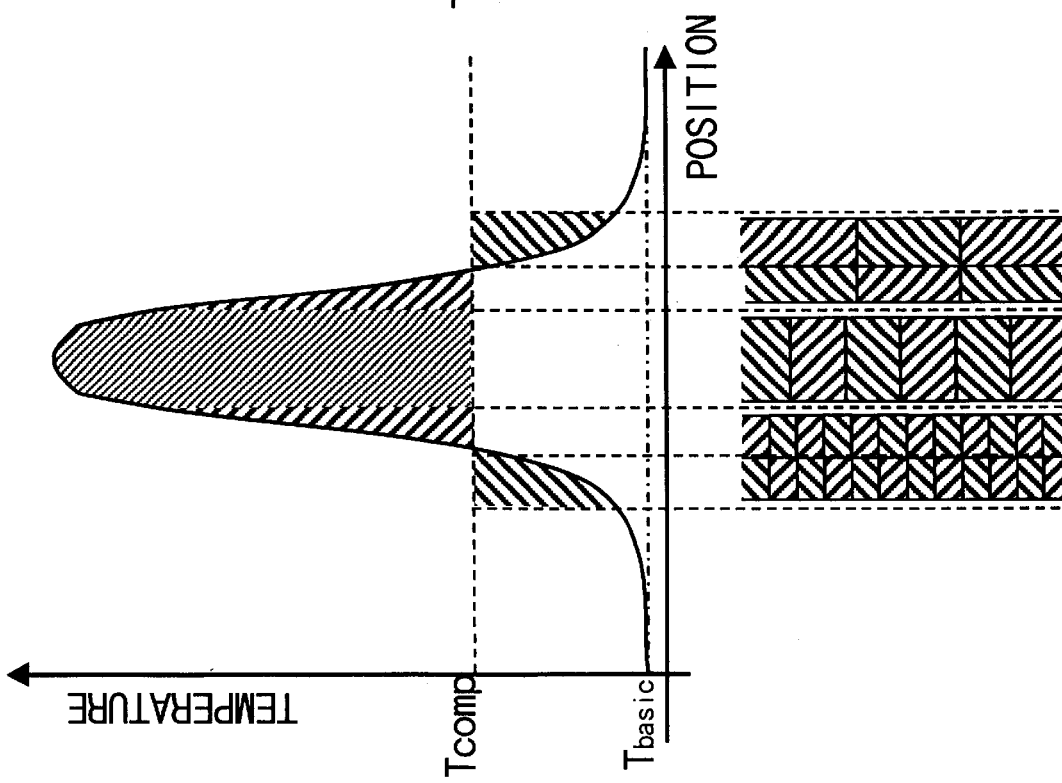

For example, when a temperature during non-temperature raising (which will be hereinafter referred to as a reference temperature) is raised in the magnetized information detecting area of the magnetic recording medium 2 with a rise in the environment temperature, the laser beam power is reduced (a maximum temperature is lowered) as shown in FIG. 9(b). Consequently, it is possible to set the average temperature of the tracks (adjacent tracks) which does not require reproduction to the vicinity of the magnetic compensation temperature (approximately 100° C.), thereby canceling the magnetized information there. Conversely, if the temperature of the magnetic recording medium 2 is lowered, the laser beam power is increased to have a certain value (the maximum temperature is raised) and the average temperature of the track which does not require the reproduction is set to be approximately 100° C., thereby canceling the magnetized information there as shown in FIG. 9(a).

The laser beam power is adjusted with the change in the environment temperature in the following manner. In the case in which the relationship between a temperature in a certain position of the thermal assist magnetic signal reproducing device and laser beam power for setting the average temperature of the adjacent tracks 5a and 5c to the vicinity of the magnetic compensation temperature (Tcomp= approximately 100° C) is obtained, the temperature of the magnetic recording medium 2 (or the environment temperature) is detected by means of a thermistor or the like and the laser beam power is thus adjusted based on the detected temperature.

Moreover, the laser beam power can be adjusted with the change in the linear speed of the magnetic recording medium 2 through a variation in the laser beam power corresponding to the reproduction target track. For example, the thermal magnetic recording device stores each track address and laser beam power required for the track as a table in an internal memory and the controller 8 operates the local temperature raising device 1 with reference to the internal memory during the reproduction. Thus, the laser beam power can be adjusted.

As a more effective method, a power control area (temperature raising state control area) is provided in the magnetic recording medium 2 to control the laser beam power, which will be described with reference to FIG. 10.

FIG. 10 illustrates a laser beam power control area 50. For simplicity, only a part of three tracks (the tracks 5a, 5b and 5c in FIG. 1) are shown. The laser beam power control area 50 is provided in a known position of an information recording area 51 for recording information data. The laser beam power control area 50 constitutes a laser beam power control block (the laser beam power control area 50 for the tracks 5a, 5b and 5c) having a width equal to or larger than at least the width of the magnetized information detecting area 4 in the direction of a track width (a direction perpendicular to a track direction). Magnetized information are recorded on the laser beam power control area 50 for the tracks 5a, 5b and 5c with a bit pattern in different cycles (the track 5a: 1T cycle, the track 5b: 2T cycle, the track 5c: 4T cycle).

When the central track 5b is to be reproduced, only a signal having the 2T cycle is reproduced from the laser beam power control area 50 if the laser beam power has an optimum value. If the laser beam power does not have the optimum value, signals having the 1T and 4T cycles are superposed (FIG. 10(*b*) shows an example of the signals).

For this reason, the cycle included in the signal shown in FIG. 10(*b*) is detected through a filter or the like and the laser beam power is adjusted such that the signals having the 1T and 4T cycles are not detected (or the signals have very low levels). Thus, it is possible to obtain optimum laser beam power.

It is also possible to detect the laser beam power by detecting the phase of a reproducing signal sent from the laser control area 50.

While different bit patterns are recorded on three tracks (5a, 5b and 5c) in FIG. 10, it is preferable that bit patterns which are different from those of the adjacent tracks should be recorded on the laser control area 50 and the same bit pattern may be recorded on the tracks 5a and 5c.

Figure 11:
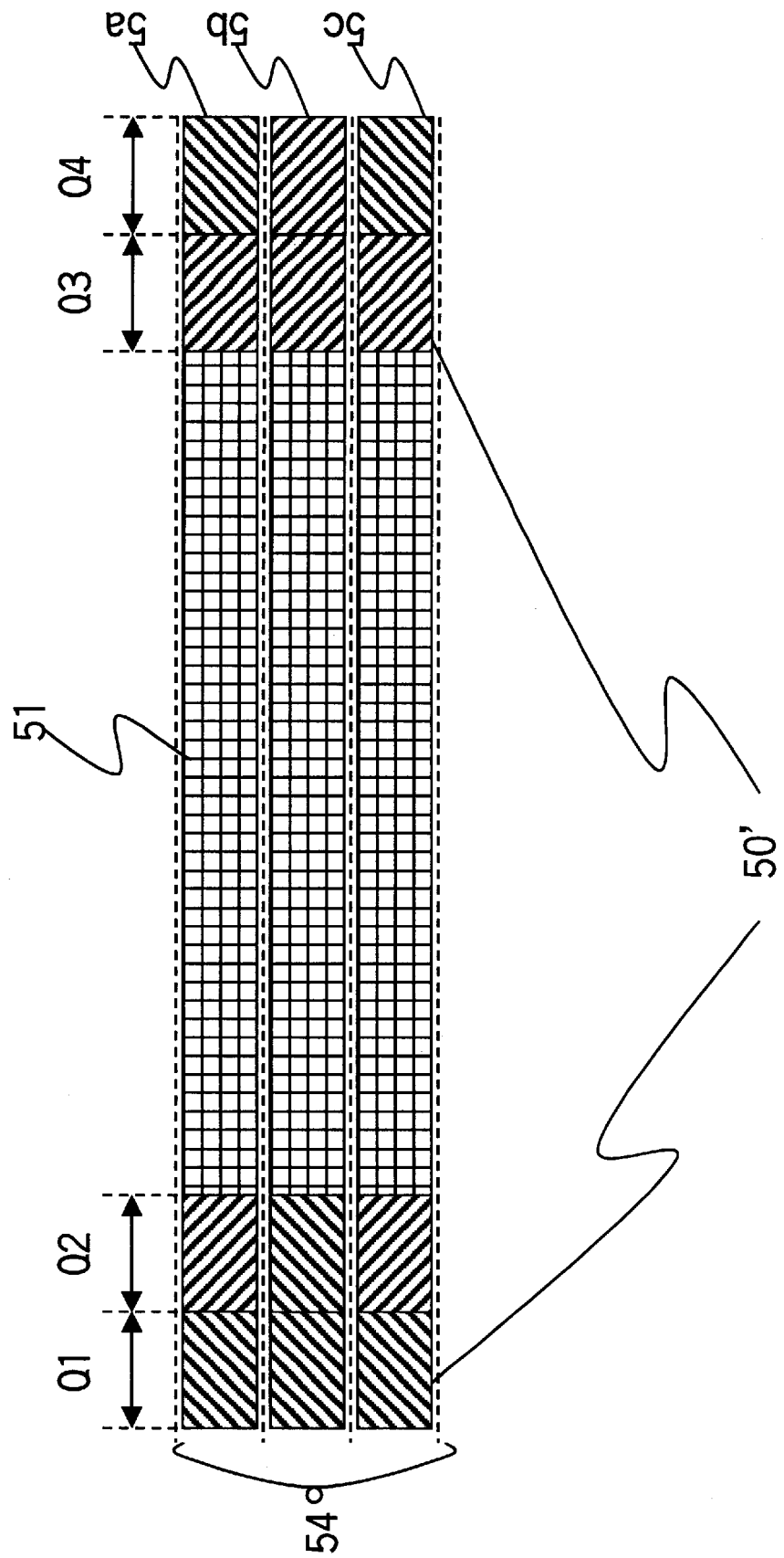
FIG. 11 is a diagram illustrating another example of the laser beam power control area.

FIG. 11 shows another example of the laser beam power control area. A laser beam power control area 50' has a bit pattern formed therein such that a track b and tracks a and c have areas magnetized in the same direction (Q 1, Q3, . . . ) and areas magnetized in the reverse direction (Q2, Q4, . . . ). In the magnetic recording medium 2 having such a laser beam power control area 50', the laser beam power control area 50' is reproduced to take a difference between a reproducing signal sent from Q1 (or Q3) and a reproducing signal sent from Q2 (or Q4) and laser beam power can be controlled depending on whether a signal thus obtained is positive or negative.

The control of the laser beam power described above does not effectively function if a tracking shift is caused. Consequently, it is desirable that tracking control which will be described below should be carried out simultaneously in the laser beam power control area 50 or immediately before the laser beam power control area 50.

The laser beam power control area 50 (50') may be recorded on a predetermined position of the magnetic recording medium (for example, the inner and outer areas of a disk). In the case in which the linear speed of the magnetic recording medium 2 is changed depending on a reproducing position, it is desirable that the laser beam power control area 50 (50') should be provided for each portion in which at least the linear speed is varied (for each block, track or sector, for example) in respect of the precise control of the laser beam power. Also in the case in which the laser beam power control area is not provided every time the linear speed is varied, it is possible to obtain approximately optimum laser beam power by adjusting the laser beam power using a table or a calculation according to a linear speed (a reproducing position).

In the case in which the laser beam power is to be controlled depending on the presence of mixture of the reproducing signals sent from the adjacent tracks 5a and 5c as shown in the examples of FIGS. 10 and 11, the laser beam power control area 50 (50') should be provided in a unit of a laser beam power control block 54 having a width equal to or larger than the width of the magnetized information detecting area 4 at least in the direction of the track width (the direction perpendicular to a track direction). Thus, more precise control can be implemented than the control of the laser beam power based on the amplitude of the reproducing signal sent from the laser beam power control area 50 in the track 5b, for example.

The adjustment control of the laser beam power using the laser beam power control area 50 described above can cope with the change in the environment temperature and linear speed of the magnetic recording medium 2. Furthermore, also in the case in which the magnetized information detection sensitivity of the reproducing head 3 is changed due to heat in the magnetized information detecting area, it can be corrected.

(4) Working condition of Magnetic Recording Medium 2 (Design of Magnetic Recording Medium 2)

In the present embodiment, it is impossible to cancel magnetized information on both adjacent tracks in principle in an area where the temperature (reference temperature) of the magnetic recording medium 2 provided under the magnetized information detecting area 4 of the reproducing head 3 during non-temperature raising is higher than the magnetic compensation temperature of the magnetic recording medium 2. In order to perform the reproduction, a temperature in the track (5b) to be reproduced should be set within the range of a temperature at which a larger magnetization that can be detected by the reproducing head 3 is generated in respect of the quality of a signal. When the temperature in the magnetic recording medium 2 reaches the vicinity of the Curie temperature, the magnetized information might become unstable and be eliminated. Therefore, the maximum temperature for local temperature raising should not reach the vicinity of the Curie temperature. In the present embodiment, accordingly, the reference temperature should be set within a certain range.

On the contrary, the temperature characteristics of the magnetic recording medium 2 can also be designed based on a reference temperature and the magnitude of a magnetization which can be detected by the reproducing head. A specific example will be described below.

Figure 12:
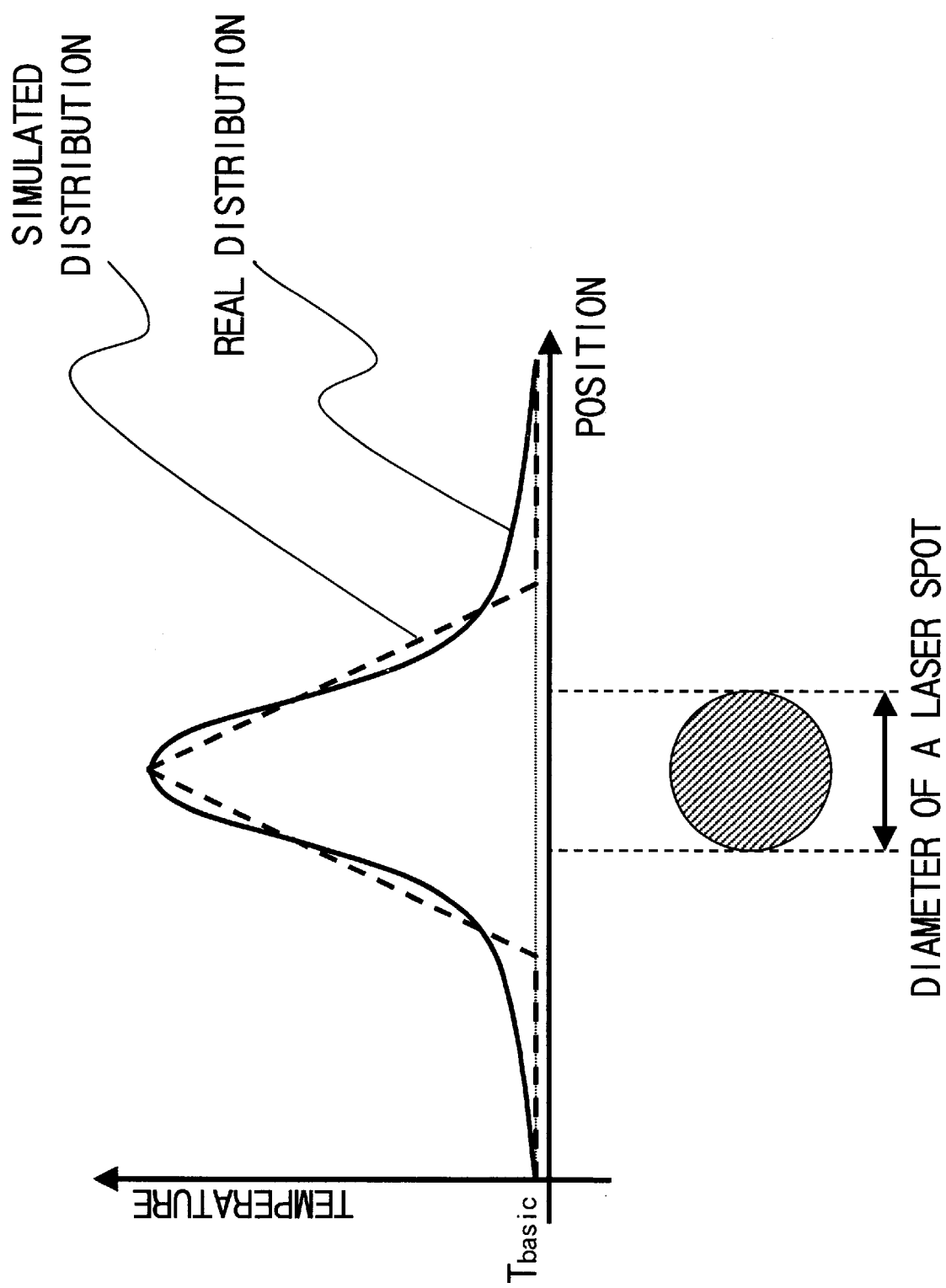
FIG. 12 is a chart illustrating an approximating method for the temperature distribution of the magnetic recording medium.

For simplicity of calculation, it is assumed that the distribution of a rise in the temperature is approximated by a combination of a linear function as shown in FIG. 12. Moreover, it is assumed that the distribution range of the raised temperature is constant and only the raised temperature is proportional to laser power. In the magnetic recording medium 2, furthermore, a point where the highest temperature is obtained is positioned in almost the central portion of a magnetized information detecting area in the reproducing head 3 and the same temperature will be hereinafter referred to as a maximum temperature.

Description will be given to an example in which the maximum temperature is approximately 200° C. in order to obtain an average temperature of approximately 100° C. on both adjacent tracks 5a and 5c in FIG. 2 when the reference temperature is approximately 50° C. and the magnetic compensation temperature of the magnetic recording medium 2 is approximately 100° C.

Figure 13:
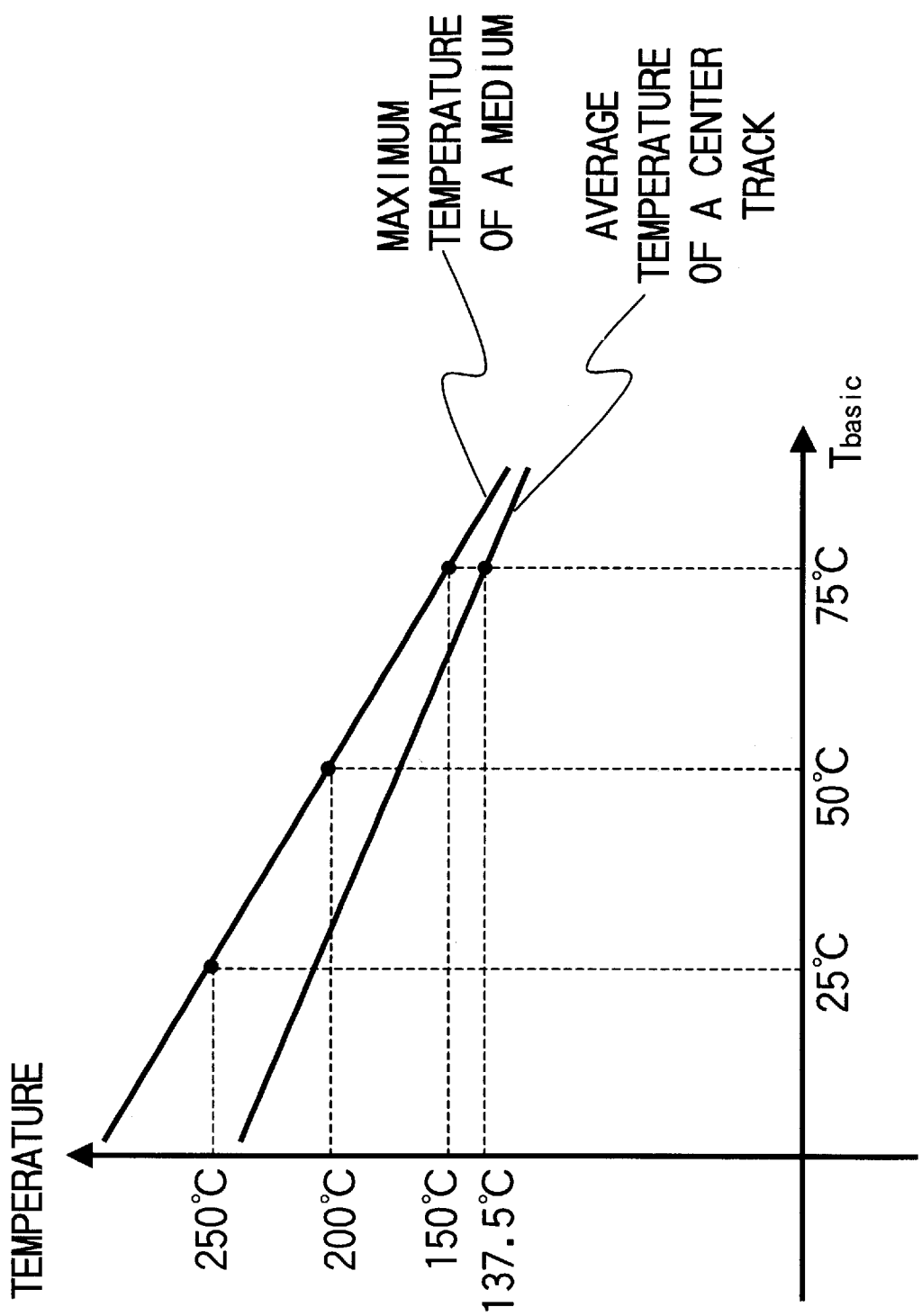
FIG. 13 is a chart illustrating a method of setting the working conditions of the magnetic recording medium.

In the case in which the environment temperature is lowered so that the reference temperature reaches approximately 25° C., the maximum temperature for setting the average temperature on both adjacent tracks to approximately 100° C. is approximately 250° C. and the average temperature of the central track 5b is 212.5° C. On the contrary, in the case in which the reference temperature reaches approximately 75° C. with a rise in the environment temperature, the maximum temperature for setting the average temperature on both adjacent tracks to approximately 100° C. is approximately 150° C. and the average temperature of the central track 5b is 137.5° C. FIG. 13 shows the relationship among the reference temperature, the maximum temperature and the average temperature of the central track.

From FIG. 13, the working conditions of the magnetic recording medium 2 can be obtained. Apparently, if the Curie temperature of the magnetic recording medium 2 is 250° C. and the average temperature of the central track 5b at which the reproducing head 3 can detect magnetized information has a lower limit of approximately 137.5° C., the reference temperature at which the magnetized information can be detected without making the magnetized information in the magnetic recording medium 2 unstable ranges from approximately 25° C. to approximately 75° C.

On the contrary, in the case in which the magnetic recording medium 2 is to be used at the reference temperature within a constant range, the magnetic compensation temperature of the magnetic recording medium 2, the Curie temperature and the lower limit of the average temperature of the central track 5b at which the reproducing head 3 can detect the magnetized information may be selected in the reverse process to the above-mentioned one.

When the laser power is varied, the temperature distribution of each of the three tracks (5a, 5b and 5c) is changed. If the temperature characteristics for the magnetization of the magnetic recording medium 2 are designed such that the temperature of the track 5b to be reproduced is set to be in the vicinity of a temperature where the magnetization of the magnetic recording medium 2 is less changed (the vicinity of Tpeak in FIG. 5), the magnetization of the track to be reproduced is not greatly changed. In particular, an n type ferrimagnetic substance is advantageous in that the temperature is set to be in the vicinity of the maximum magnetization and a large absolute value of the magnetization in the track 5b to be reproduced can be taken.

(5) Tracking Control

Tracking control in the thermal assist magnetic signal reproducing system according to the present embodiment will be described below.

Figure 14:
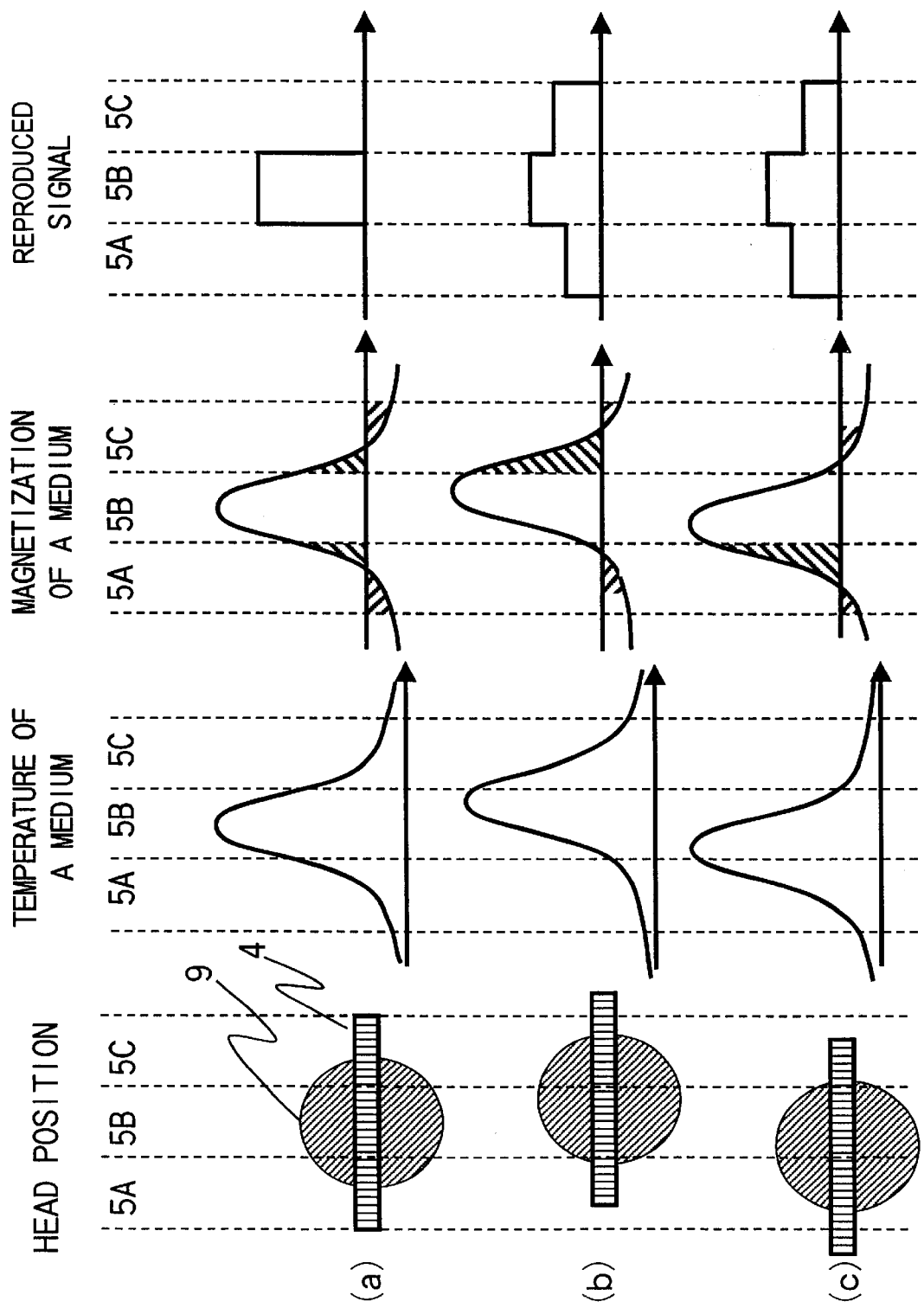
FIGS. 14(a) to 14(c) are charts illustrating a tracking control method.

FIG. 14 illustrates the tracking control. FIG. 14(a) shows the case in which a tracking shift is not caused, and FIGS. 14(b) and 14(c) show the case in which the tracking shift is caused. As a medium magnetization in FIG. 14, a magnetization in the same direction is recorded on the tracks 5a, 5b and 5c, respectively. As a reproducing signal strength in FIG. 14, a reproducing signal obtained from each of the tracks 5a, 5b and 5c is described separately (the direction of the magnetization is ignored).

In FIG. 14(a), a magnetic recording medium temperature is distributed around the central track 5b and the magnetization of the magnetic recording medium is wholly canceled in the tracks 5a and 5c to be approximately zero. For this reason, the reproducing signal cannot be obtained from the tracks 5a and 5c.

In FIGS. 14(b) and 14(c), the magnetic recording medium temperature is distributed out of the center of the central track 5b. Therefore, both tracks 5a and 5c have large magnetizations so that a reproducing signal is generated. In this case, the reproducing signals sent from the adjacent tracks 5a and 5c become noises. Accordingly, when the tracking shift is caused as shown in FIGS. 14(b) and 14(c), the quality of the reproducing signal is deteriorated.

In the present embodiment, therefore, the tracking control is very important. While there are various tracking control methods, description will be given to a method for carrying out tracking control by utilizing the property of the thermal assist magnetic signal reproducing system according to the present embodiment.

Figure 15:
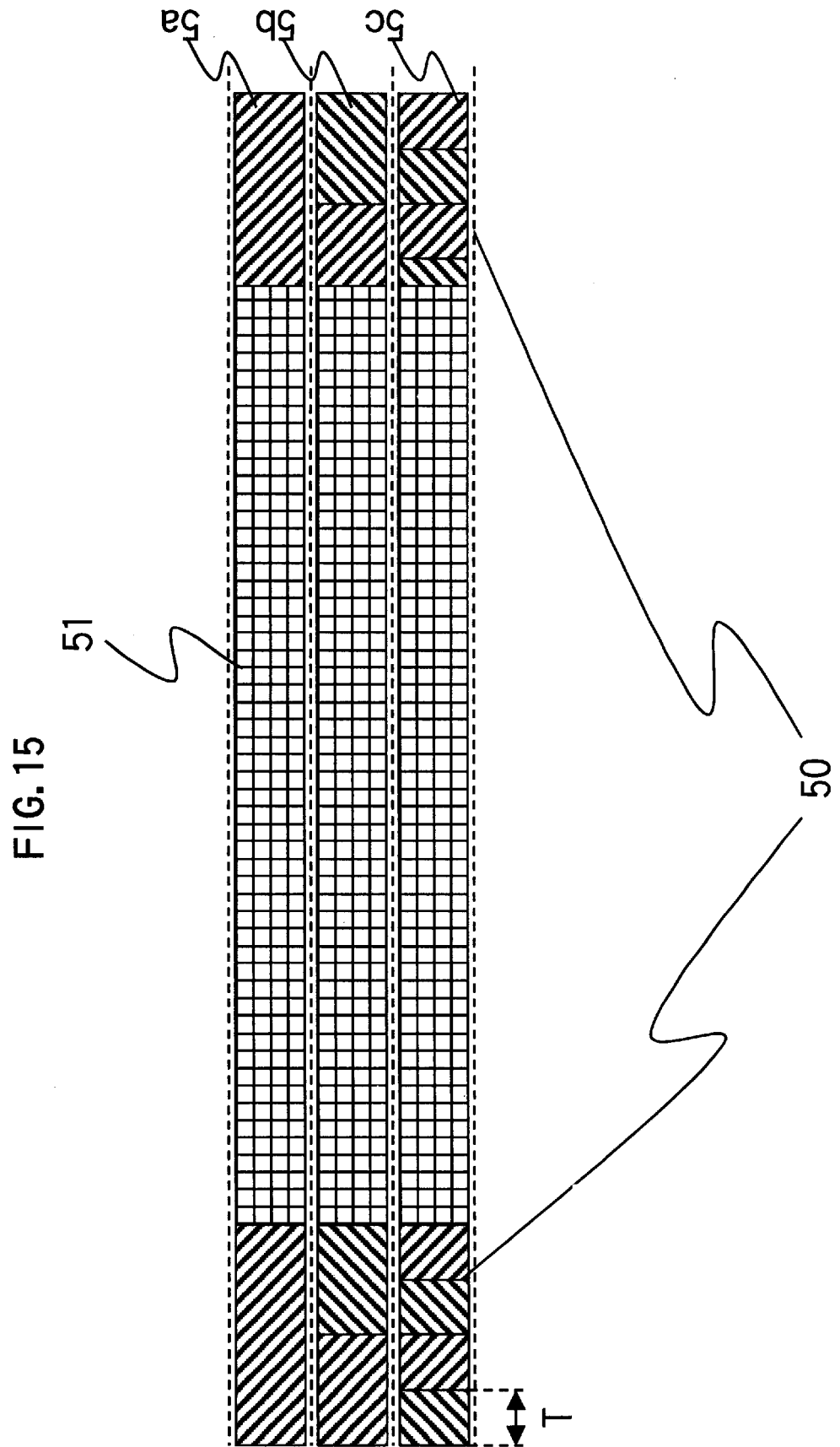
FIG. 15 is a diagram illustrating a tracking control area.

FIG. 15 is a diagram illustrating the tracking control method. For simplicity, only a part of three tracks (tracks 5a, 5b and 5c in FIG. 1) is shown. A tracking control area 52 is provided in an information recording area 51 for recording information data. The tracking control area 52 is provided in a known position and known magnetized information is recorded on the tracks 5a, 5b and 5c with bit patterns having different cycles (track 5a: 1T cycle, track 5b: 2T cycle, track 5c: 4T cycle), respectively.

When the central track 5b is to be reproduced, only a signal having the 2T cycle is reproduced from the tracking control area 52 if the tracking shift is not caused. If the tracking shift is caused, signals having the 1T cycle and the 4T cycle are superposed. Accordingly, if any cycle included in a reproducing signal sent from the tracking control area 52 is detected by using a filter or the like, the tracking control can be carried out based on the detected signal.

More specifically, the strengths of the signal having the 1T cycle (track 5a) and the signal having the 4T cycle (track 5c) are compared with each other. If the strengths are equal to each other, it is found that the tracking shift is not caused. Conversely, if either of the strengths is larger, the center of a laser spot (and the center of the reproducing head 3) is (are) shifted toward the track with the larger signal. Consequently, the center of the laser spot (and the center of the reproducing head 3) is (are) moved toward the track with the smaller signal. Thus, the tracking shift is eliminated.

(6) Others

An example of the thermal assist magnetic signal reproducing system (the magnetic signal reproducing device, the magnetic signal reproducing method and the magnetic recording medium) according to the present embodiment has been described above, and the present embodiment can be variously modified without departing from the scope of the invention.

For example, the track pitch, the laser spot diameter, the track spacing and the like according to the present embodiment are not restricted.

Moreover, the magnetic recording medium is not restricted to the present embodiment if it has such a characteristic that the polarity of the magnetization is inverted depending on a temperature.

Furthermore, if a moving mechanism for a relative position to the magnetic recording medium of the reproducing head 3 can thoroughly detect the magnetized information recorded on the magnetic recording medium through the reproducing head, it is not restricted to the present embodiment.

While the width in the track width direction of the magnetized information detecting area 4 of the reproducing head 3 has been set to be the width for three tracks, the thermal assist magnetic signal reproducing system according to the present embodiment can be applied if the width corresponds to approximately three tracks. If the width in the track width direction of the magnetized information detecting area 4 corresponds to approximately three tracks, the highest density reproduction can be implemented in the method according to the present embodiment.

The laser beam power control recording area 50 and the tracking control recording area 52 may be identical. More specifically, the laser beam power control and the tracking control may be carried out with the same known bit pattern. Moreover, at least one of the bit patterns recorded on the laser beam power control recording area 50 and the tracking control recording area 52 may be address information. In these cases, the recording area of the known data can be reduced and the recording area of the information data can be increased. Furthermore, it is apparent that the bit patterns are not restricted to those shown in FIGS. 10, 11 and 15.

[Second Embodiment]

A thermal assist magnetic signal reproducing device according to the present embodiment reproduces magnetized information about only a track positioned in almost the central portion of a magnetized information detecting area having a pitch almost five times as large as a track pitch which is included in magnetic recording information recorded at constant spacing with constant track pitches through a reproducing head having the magnetized information detecting area by using a magnetic signal reproducing method by means of an n-type ferrimagnetic substance having a higher magnetic compensation temperature than a temperature in a non-temperature raising state. A laser beam including higher diffracted light is irradiated as local temperature raising means.

In the present embodiment, components having the same functions as those in the first embodiment have the same reference numerals and their description will be omitted.

Figure 16:
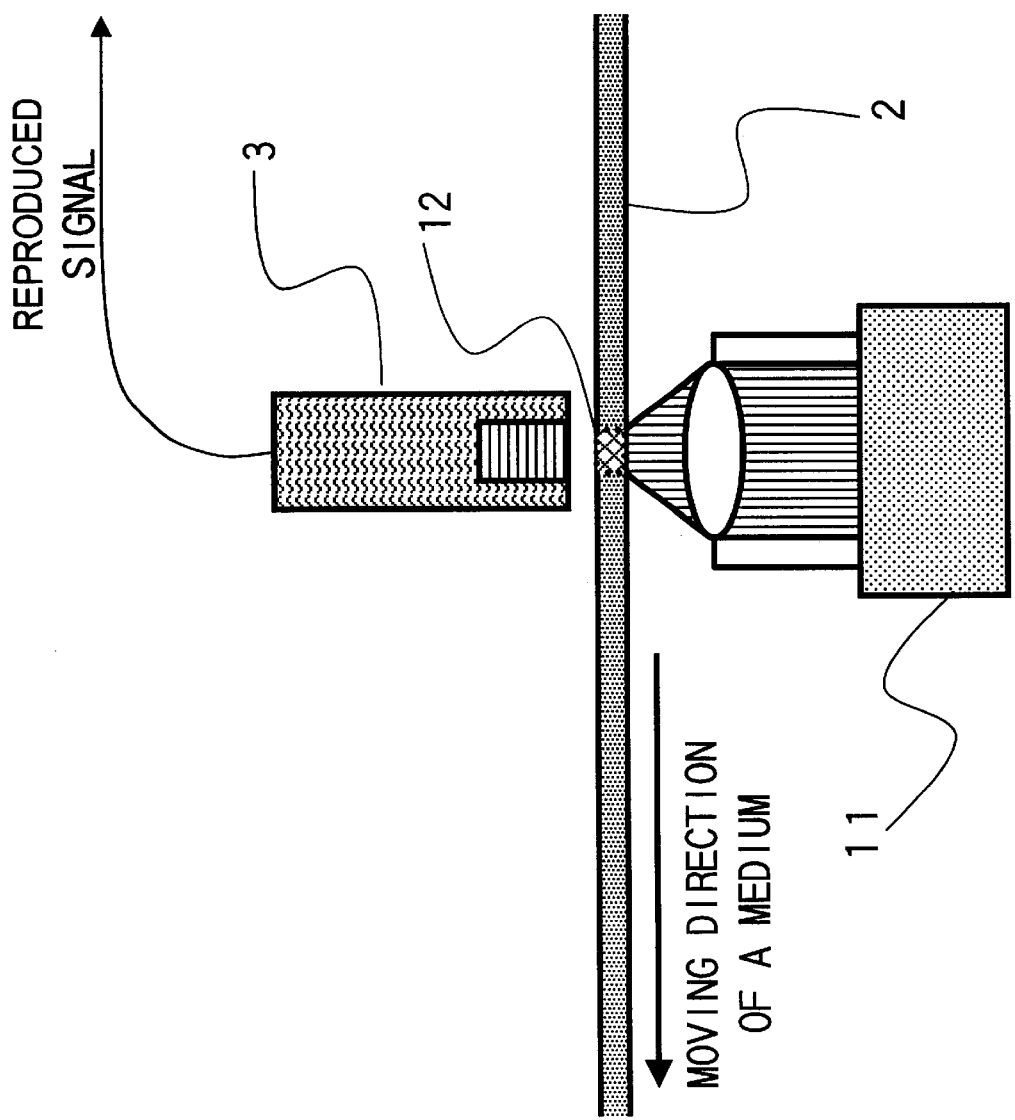
FIG. 16 is a schematic view showing the main structure of a magnetic signal reproducing device according to a second embodiment of the present invention.

FIG. 16 is a diagram showing the structure of the thermal assist magnetic signal reproducing device according to the present embodiment. The thermal assist magnetic signal reproducing device employs a local temperature raising device 11 differently from the thermal assist magnetic signal reproducing device according to the first embodiment shown in FIG. 7.

Figure 17:
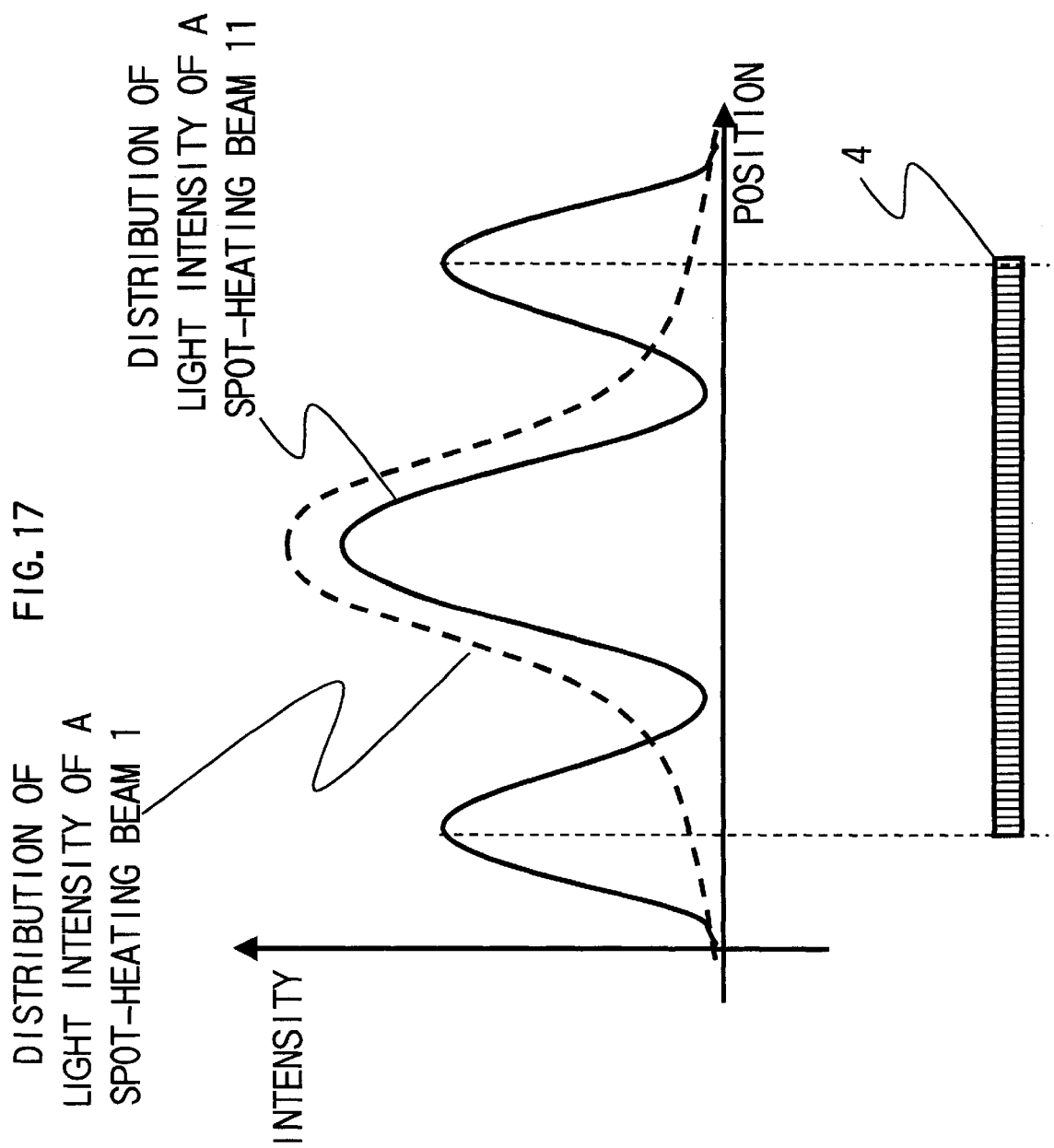
FIG. 17 is a chart illustrating the light intensity distribution of a laser beam spot generated from a local temperature raising device according to the second embodiment.

The local temperature raising device 11 forms a laser spot having an intensity distribution shown in FIG. 17 on a magnetic recording medium 2. In FIG. 17, the intensity distribution of the laser spot by the local temperature raising device 1 according to the first embodiment is also illustrated for comparison. As shown in FIG. 17, the laser beam including higher diffracted light is irradiated on the magnetic recording medium 2 in the present embodiment. More specifically, a laser beam having a main peak on the center and sub-peaks on both sides thereof is irradiated . In this case, even if an optical system having the same wavelength and the same aperture diameter is used, the diameter of the central main peak in the local temperature raising device 11 is smaller than that in the local temperature raising device 1 according to the first embodiment due to a diffraction phenomenon.

As shown in FIG. 17, the positional relationship between a magnetized information detecting area 4 of a reproducing head 3 and the laser spot is set such that a position (central position) in which the highest light intensity is obtained is almost coincident with the center of the magnetized information detecting area 4.

Figure 18:
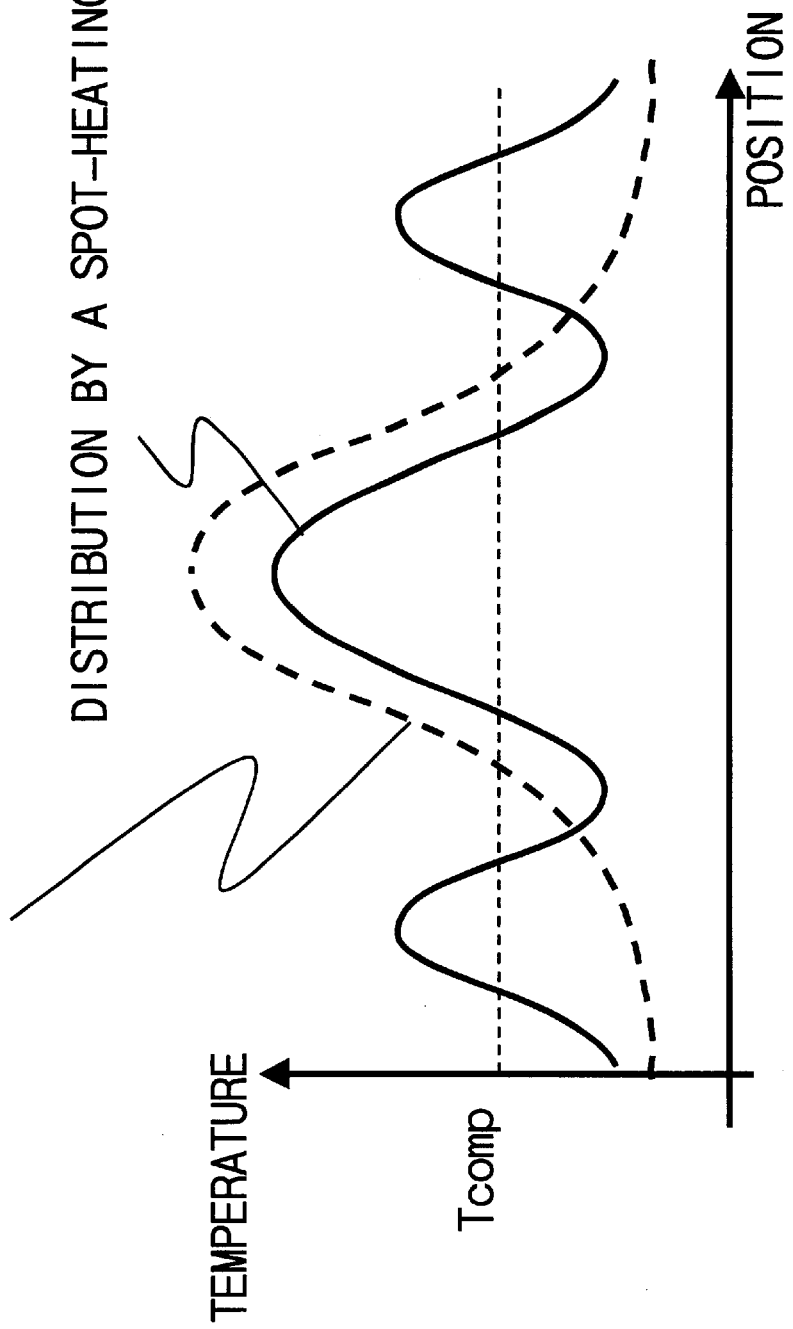
FIG. 18 is a chart illustrating a temperature distribution formed on the magnetic recording medium by means of the local temperature raising device according to the second embodiment.

FIG. 18 is a chart showing a temperature distribution obtained on the magnetic recording medium 2 by the irradiation on the laser spot by the local temperature raising device 11. As shown in FIG. 18, a portion having a high temperature appears in three parts on the magnetic recording medium 2, that is, the central part of the laser spot and both sides thereof. The temperature of the high temperature portion in the magnetic recording medium 2 is set higher than a magnetic compensation temperature Tcomp (approximately 100° C).

Figure 19:
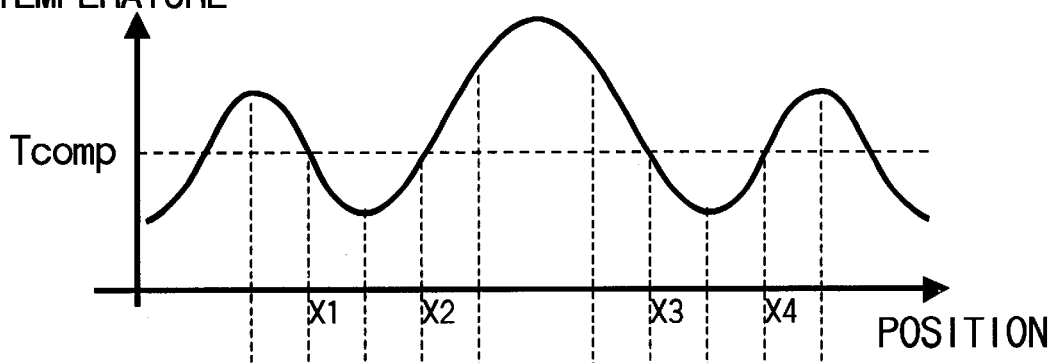
FIGS. 19(a) to 19(d) are diagrams illustrating a magnetic signal recording method according to the second embodiment.
Figure 19:
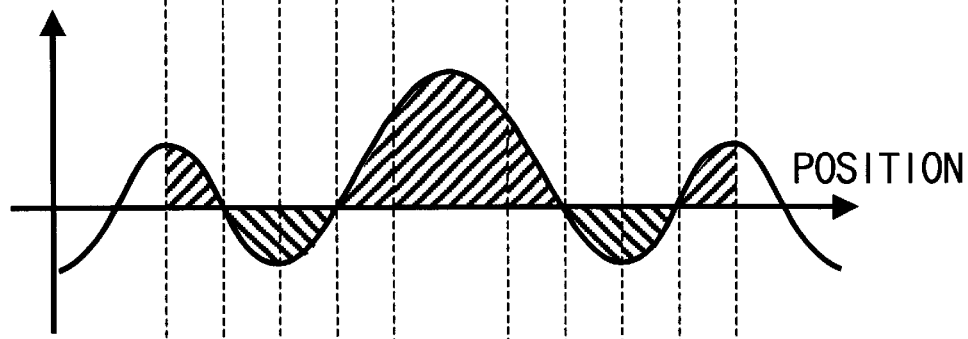
Figure 19:
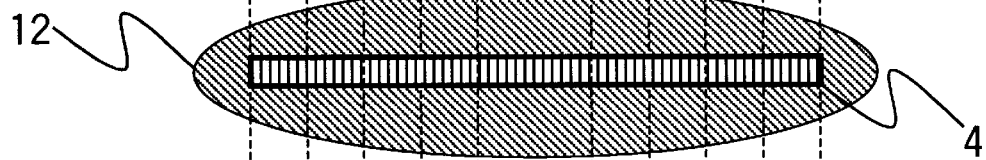
Figure 19:
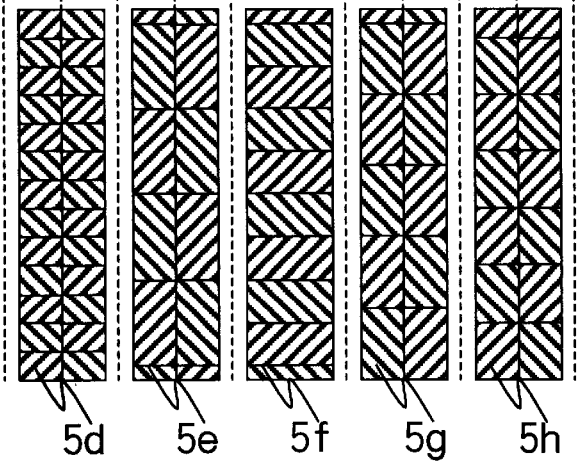
Figure 20:
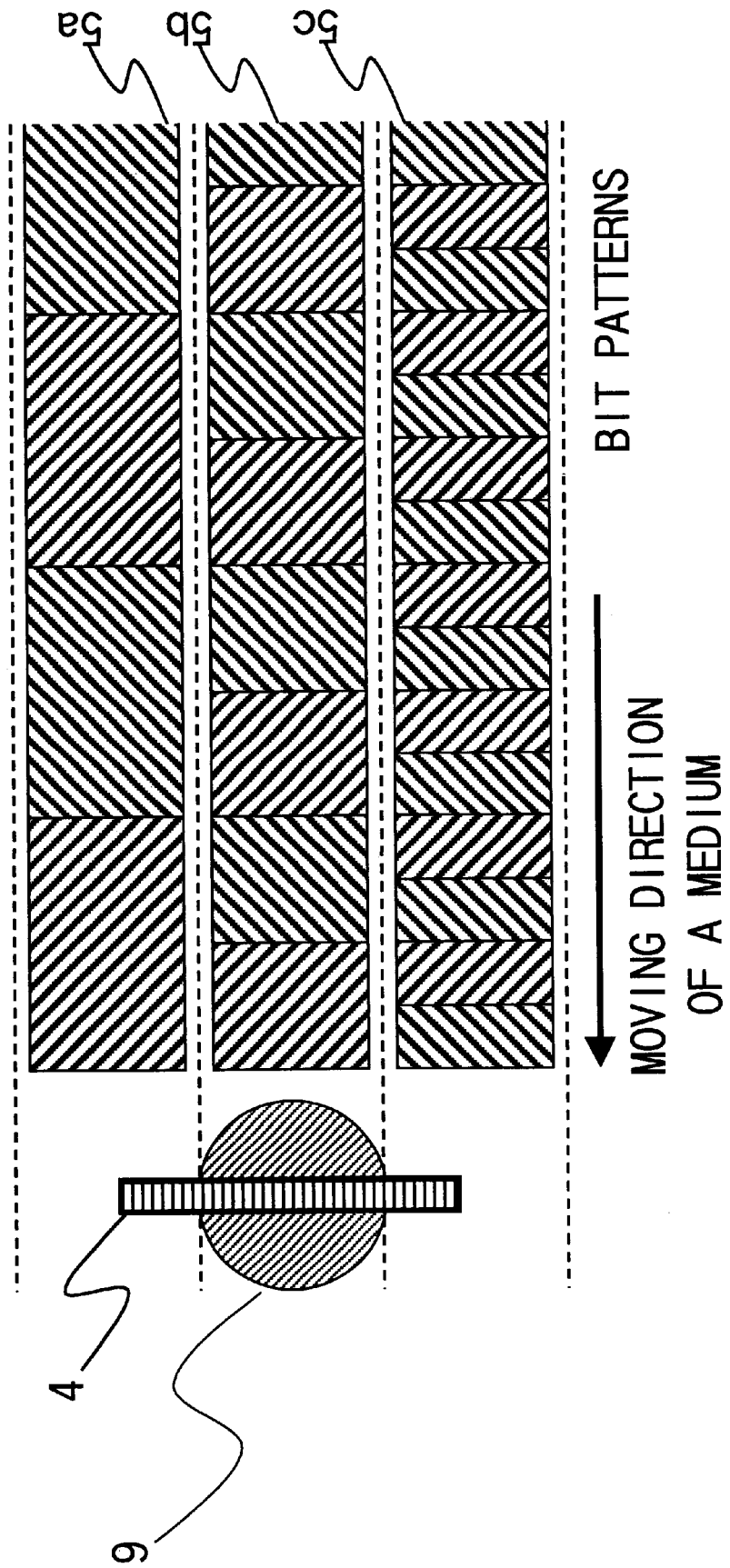
FIG. 20 is a diagram showing a positional relationship between a bit pattern of a magnetic recording medium, a magnetized information detecting area and a laser spot.
Figure 21:
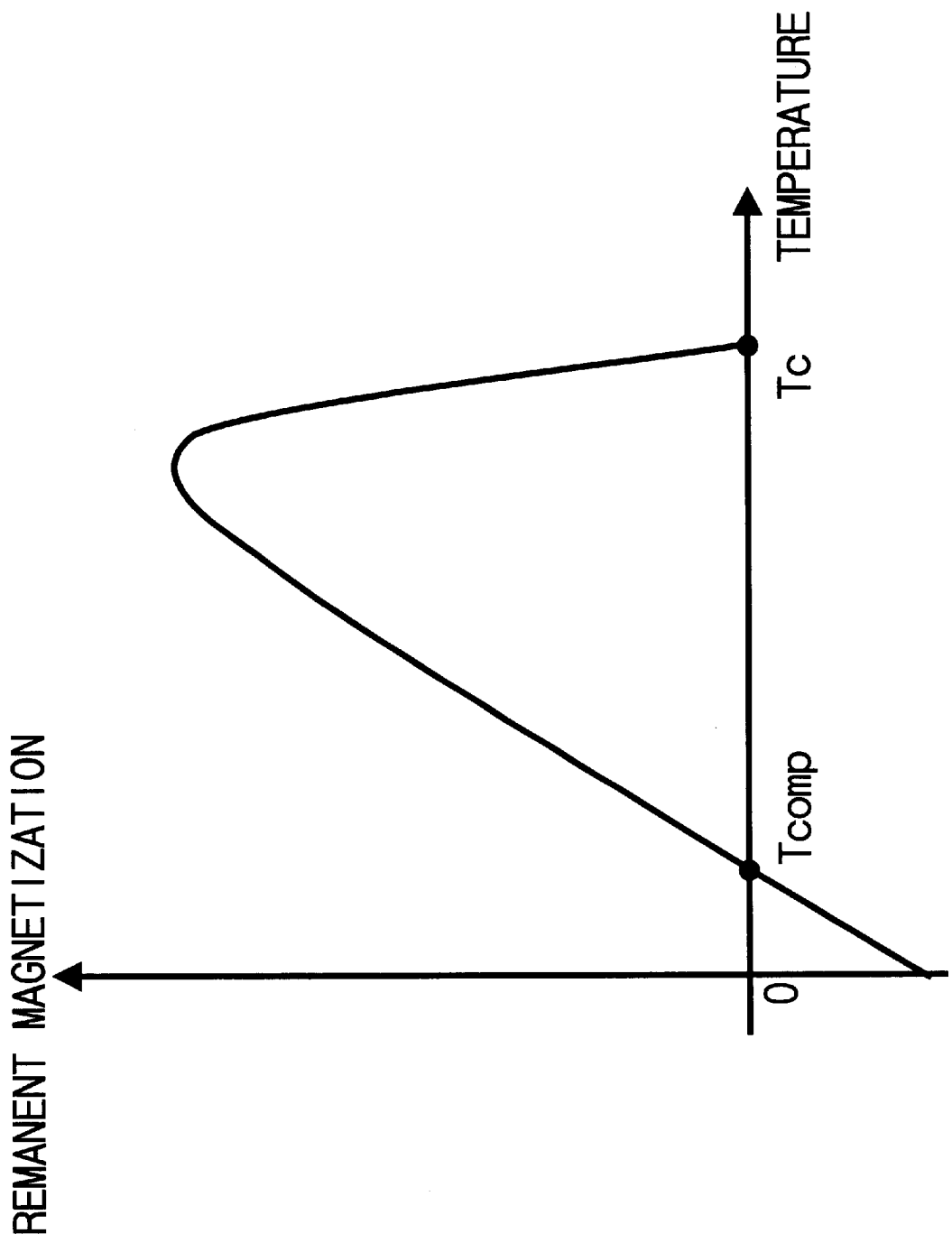
FIG. 21 is a chart showing the magnetic characteristic of a conventional magnetic recording medium.

FIG. 19 shows the temperature distribution of the magnetic recording medium 2 (FIG. 19(*a*)) and a magnetization obtained when raising the temperature of the magnetic recording medium 2 which is magnetized in a uniform direction (FIG. 19(*b*)) together with the magnetized information detecting area 4 and a temperature raising area 9 (FIG. 19(*d*)) and a track 5 formed on the magnetic recording medium 2 (FIG. 19(*d*)). In the present embodiment, five tracks 5*d*, 5*e*, 5*f*, 5*g* and 5*h* are present in the magnetization detecting area 4 of the reproducing head 3. As shown in FIG. 19, the temperature raising device 11 heats such that the central track (reproduction target track) 5*f* of the magnetic recording medium 2 reaches Tcomp or more and the average temperature of the tracks 5*d*, 5*e*, 5*g* and 5*h* reaches the vicinity of Tcomp. For example, points (X1, X2, X3 and X4) in which the temperature of the magnetic recording medium 2 reaches approximately Tcomp as shown in FIG. 19(*a*) are heated such that portions between X1 and X2 and between X3 and X4 are almost equal to a track width and a portion between X2 and X3 is almost a double of the track width.

At this time, a magnetic flux is generated from the central track 5*f* so that a reproducing signal is obtained, while magnetizations of the tracks 5*c*, 5*d*, 5*g* and 5*h* are wholly canceled and are equal to almost zero. Therefore, the reproducing signal is not generated. Accordingly, magnetized information about only the central track 5*f* can be reproduced.

Also in the present embodiment, the control of laser beam power, tracking control and the setting of working conditions can be carried out in the same manner as those in the first embodiment.

Furthermore, the present embodiment can also be variously modified in the same manner as the first embodiment.

Numerous modifications and alternative embodiments of the invention will be apparent to those skilled in the art in view of the foregoing description. Accordingly, this description is to be construed as illustrative only, and is provided for the purpose of teaching those skilled in the art the best mode of carrying out the invention. The details of the structure and/or function may be varied substantially without departing from the spirit of the invention and all modifications which come within the scope of the appended claims are reserved.

What is claimed is:

1. A magnetic signal reproducing device for reproducing information from a magnetic recording medium in which a polarity of magnetization is inverted at a first temperature during temperature change, the device comprising:

local temperature raising means for locally raising the temperature of the magnetic recording medium;

reproducing means having a magnetized information detecting area for magnetically detecting information recorded on the magnetic recording medium, and during a reproducing operation, the local temperature raising means forms an area having a lower temperature than the first temperature and an area having a higher temperature that the first temperature within an area in the magnetic recording medium which area is facing the magnetized information detecting area, thereby reducing contribution to reproduced signal from magnetization of an area other than a reproduction target area, wherein the local temperature raising means forms an area having a lower temperature than the first temperature and an area having a higher temperature than the first temperature within an area other than the reproduction target area.

2. A magnetic recording medium as claimed in claim 1, the temperature of which is locally raised and in which magnetized information in a portion having the temperature raised is reproduced magnetically, wherein a magnetic layer having a magnetic compensation temperature is provided, a polarity of magnetization is inverted at the magnetic compensation temperature as a boundary during temperature raising, and a temperature raising state control area in which known data for controlling a temperature raising state are recorded is provided.

3. The device according to claim 1, further comprising control means for controlling an operation of the local temperature raising means, thereby changing a temperature raising state of the magnetic recording medium.

4. The device according to claim 3, wherein the magnetic recording medium has a temperature raising state control area in which known data for controlling a temperature raising state by the local temperature raising means is recorded, and the control means controls the operation of the local temperature raising means based on a reproduced signal reproduced from the temperature raising state control area.

5. The device according to claim 4, wherein the temperature raising state control area is formed in at least one portion of an area in the magnetic recording medium in which area a linear speed is almost equal.

6. The device according to claim 4, wherein the temperature raising state control area comprises a temperature raising state control block having at least a width equal to or greater than a width of the magnetization detecting area in a direction perpendicular to a scanning direction of the reproducing means.

7. The device according to claim 3, further comprising detecting means for measuring a working environment temperature of the magnetic recording medium, wherein the control means controls the operation of the local temperature raising means based on a result of the detection of the detecting means.

8. A magnetic signal reproducing device for reproducing information from a magnetic recording medium which is provided with a magnetic film having a magnetic compensation temperature and is formed such that a polarity of magnetization is inverted at the magnetic compensation temperature during temperature change, the device comprising:

local temperature raising means for locally raising the temperature of the magnetic recording medium;

reproducing means having a magnetized information detecting area for magnetically detecting information recorded on the magnetic recording medium, and during a reproducing operation, the local temperature raising means forms an area having a lower temperature than the magnetic compensation temperature and an area having a higher temperature than the magnetic compensation temperature within an area in the magnetic recording medium which area is facing the magnetized information detecting area and is other than a reproduction target area, thereby reducing contribution to reproduced signal from magnetization of the area other than the reproduction target area, wherein the magnetic recording medium is provided with a plurality of tracks for recording information, and the local temperature raising means forms an area having a lower temperature than the magnetic compensation temperature and an area having a higher temperature than the magnetic compensation temperature in tracks other than a reproduction target track within an area in the magnetic recording medium which area is facing the magnetized information detecting area.

9. The device according to claim 8, wherein the local temperature raising means raises the temperature of the magnetic recording medium so that an average temperature of the area having the lower temperature and the area having the higher temperature is almost equal to the magnetic compensation temperature.

10. The device according to claim 8, wherein the local temperature raising means forms, on the magnetic recording medium, a temperature distribution having at least two maximal values which exceed the magnetic compensation temperature.

11. A magnetic signal reproducing device for reproducing information from a magnetic recording medium which is provided with a plurality of tracks for recording information and a magnetic film having a magnetic compensation temperature and in which a polarity of magnetization is inverted at the magnetic compensation temperature during temperature change, the device comprising:

local temperature raising means for irradiating the magnetic recording medium with a laser beam to locally raise the temperature of the magnetic recording medium; and reproducing means having a magnetized information detecting area for magnetically detecting magnetized information recorded on the magnetic recording medium, the reproducing means being so arranged that the center of the laser beam is almost coincident with the center of the magnetized information detecting area in a direction of a track width, wherein the magnetized information detecting area has a width at least partially facing three tracks of the magnetic recording medium in the direction of the track width, and during a reproducing operation, the local temperature raising means raises the temperature of a central track facing the magnetized information detecting area over the magnetic compensation temperature and raises the temperatures of two tracks adjacent to the central track such that an average temperature in each of the adjacent two tracks is almost equal to the magnetic compensation temperature, thereby reducing contribution to reproduced signal from magnetization of the two adjacent tracks.

12. A magnetic signal reproducing method comprising the steps of:

using a magnetic recording medium in which the polarity of magnetized information is inverted at a first temperature during temperature change;

locally raising the temperature of the magnetic recording medium by local temperature raising means; and magnetically detecting magnetized information recorded on the magnetic recording medium by reproducing means having a magnetized information detecting area facing at least a part of a portion having a temperature raised, wherein, during a reproducing operation, the temperature of the magnetic recording medium is raised such that an area having a lower temperature than the first temperature and an area having a higher temperature than the first temperature are formed within an area in the magnetic recording medium which area is other than a reproduction target area and is facing the magnetized information detecting area, and thereby contribution to reproduced signal from magnetization of the area other than the reproduction target area is reduced.

13. The method according to claim 12, wherein the temperature of the magnetic recording medium is raised such that the absolute value of average magnetization in the area having the lower temperature is almost identical to the absolute value of average magnetization in the area having the higher temperature.

14. A magnetic signal reproducing method comprising the steps of:

using a magnetic recording medium which is provided with a magnetic film having a magnetic compensation temperature and is formed such that the polarity of magnetized information is inverted at the magnetic compensation temperature during temperature change;

locally raising the temperature of the magnetic recording medium by local temperature raising means; and magnetically detecting magnetized information recorded on the magnetic recording medium by reproducing means having a magnetized information detecting area facing at least a part of a portion having a temperature raised, wherein, during a reproducing operation, the temperature of the magnetic recording medium is raised such that an area having a lower temperature than the magnetic compensation temperature and an area having a higher temperature than the magnetic compensation temperature are formed within an area in the magnetic recording medium which area is other than a reproduction target area and is facing the magnetized information detecting area, and thereby contribution to reproduced signal from magnetization of the area other than the reproduction target area is reduced.

15. A magnetic signal reproducing method comprising the steps of:

using a magnetic recording medium which is provided with a plurality of tracks for recording information and a magnetic film having a magnetic compensation temperature and in which the polarity of magnetized information is inverted at the magnetic compensation temperature during temperature change;

locally raising the temperature of the magnetic recording medium by irradiation with a laser beam; and magnetically detecting magnetized information recorded on the magnetic recording medium by a magnetized information detecting area of reproducing means which area is facing at least a part of a portion having a temperature raised, wherein the magnetized information detecting area has a width at least partially facing three tracks of the magnetic recording medium in a direction of a track width, the reproducing means is so situated that the center of the laser beam is almost coincident with the center of the magnetized information detecting area in the direction of the track width, and during a reproducing operation, the temperature of the magnetic recording media is raised such that the temperature of a central track opposed to the magnetized information detecting area is over the magnetic compensation temperature and the average temperature in an area of each of two tracks adjacent to the central track which area is facing the magnetized information detecting area is almost equal to the magnetic compensation temperature, and thereby contribution to reproduced signal from magnetization of the two adjacent tracks is reduced.

* * * * *